US012748959B2

(12) United States Patent
Yuan et al.

(10) Patent No.: US 12,748,959 B2
(45) Date of Patent: Sep. 29, 2026

(54) NEURAL NETWORK SCHEDULING METHOD AND APPARATUS

(71) Applicant: HUAWEI TECHNOLOGIES CO., LTD., Shenzhen (CN)

(72) Inventors: Honghui Yuan, Shenzhen (CN); Shucheng Li, Shenzhen (CN); Lejin Xiong, Shenzhen (CN); Chernega Nikita, Shenzhen (CN)

( * ) Notice: Subject to any disclaimer, the term of this patent is extended or adjusted under 35 U.S.C. 154(b) by 876 days.

(21) Appl. No.: 18/070,054

(22) Filed: Nov. 28, 2022

(65) Prior Publication Data

US 2023/0085718 A1 Mar. 23, 2023

Related U.S. Application Data

(63) Continuation of application No. PCT/CN2020/093544, filed on May 29, 2020.

(51) Int. Cl.
*G06N 3/063* (2023.01)

(52) U.S. Cl.
CPC .................................... *G06N 3/063* (2013.01)

(58) Field of Classification Search
None
See application file for complete search history.

(56) References Cited

U.S. PATENT DOCUMENTS 10,019,668 B1* 7/2018 Woo ........................ G06N 3/042
11,216,726 B2* 1/2022 Young .................. G06N 3/0464
2019/0243755 A1 8/2019 Luo et al.
2019/0303762 A1* 10/2019 Sui ....................... G06N 3/0464

FOREIGN PATENT DOCUMENTS

CN 107454965 A 12/2017

OTHER PUBLICATIONS

Lym, Sangkug & Behroozi, Armand & Wen, Wei & Li, Ge & Kwon, Yongkee & Erez, Mattan. (2018). Mini-batch Serialization: CNN Training with Inter-layer Data Reuse. 10.48550/arXiv.1810.00307. (Year: 2018).*

Y. Shen, M. Ferdman and P. Milder, "Escher: A CNN Accelerator with Flexible Buffering to Minimize Off-Chip Transfer," 2017 IEEE 25th Annual International Symposium on Field-Programmable Custom Computing Machines (FCCM), Napa, CA, USA, 2017, pp. 93-100, doi: 10.1109/FCCM.2017.47. (Year: 2017).*

Lym et al., "Mini-batch Serialization: CNN Training with Inter-layer Data Reuse," CoRR, submitted on May 4, 2019, arXiv: 1810.00307v4, 12 pages.

Extended European Search Report in European Appln No. 20938103.7, dated May 26, 2023, 7 pages.

International Search Report and Written Opinion in International Appln. No. PCT/CN2020/093544, mailed on Feb. 24, 2021, 16 pages (with English translation).

* cited by examiner

*Primary Examiner* — Omar F Fernandez Rivas
*Assistant Examiner* — Corey M Sackalosky
(74) *Attorney, Agent, or Firm* — Fish & Richardson P.C.

(57) ABSTRACT

A neural network scheduling method and apparatus are provided One example method includes: determining a first batch size corresponding to each layer of one or more layers in a neural network; forming, through grouping based on the first batch size, the neural network into a neural network including at least one first layer group forming, through grouping based on a grouping result of the first layer group, the neural network into a neural network including at least one second layer group and scheduling the neural network based on a grouping result of the second layer group.

20 Claims, 13 Drawing Sheets

NEURAL NETWORK SCHEDULING METHOD AND APPARATUS

CROSS-REFERENCE TO RELATED APPLICATIONS

This application is a continuation of International Application No. PCT/CN2020/093544, filed on May 29, 2020, the disclosure of which is hereby incorporated by reference in its entirety.

TECHNICAL FIELD

Embodiments of this application relate to the field of artificial intelligence (artificial intelligence, AI) technologies, and in particular, to a neural network scheduling method and apparatus.

BACKGROUND

A neural network is a machine learning model that generates output data for received input data by using one or more operation layers. In addition to an input layer and an output layer, the neural network further includes one or more hidden layers. Output data of each hidden layer is input data of a next hidden layer or the output layer. During an operation, each hidden layer needs to store input data and output data of the layer in an on-chip memory. Due to a limitation of a capacity of the on-chip memory, the input data of each hidden layer in the neural network cannot be excessively large. Otherwise, buffer requirements corresponding to some hidden layers may exceed the capacity of the on-chip memory. Therefore, a batch (batch) concept is proposed, that is, a batch is used as a granularity to input the input data to the neural network for an operation, and a buffer requirement of each hidden layer in the neural network is limited by using a size of the batch.

However, a batch size is determined only for buffer requirements of input data and output data of each hidden layer. Due to a limitation of a hidden layer with a largest buffer requirement, a batch size of input data of the neural network is small. This affects overall operation efficiency of the neural network. Therefore, in a conventional technology, a neural network scheduling method is proposed. Based on correlation between input data and output data of each hidden layer in the neural network and both a layer previous to the hidden layer and a layer following the hidden layer, and a feature that a buffer requirement may be lowered when a size of output data of some hidden layers is less than a size of input data, the neural network is divided into a plurality of super layers (super layer), and each super layer includes one or more hidden layers. A sequence of scheduling the hidden layers in the neural network is adjusted to construct the super layer and lower the buffer requirement, so that a batch size of input data of the super layer can be increased.

For example, it is assumed that the capacity of the on-chip memory is 12 units. As shown in (a) in FIG. 1, a neural network includes five layers. A batch element 0 whose batch size is 1 is input, and the layers correspond to different buffer requirements. A maximum batch size of input data of the neural network is 1 due to a limitation of eight-unit buffer requirement of a layer B. Based on this, as shown in (b) in FIG. 1, in the conventional technology, the neural network may be divided, to form a layer A, the layer B, and a layer C into a super L1, and form a layer D and an layer E into a super L2. The neural network existing after division can process input data that includes the batch element 0 and the batch element 1 and whose batch size is 2. This increases the batch size.

In an existing method for scheduling the neural network based on the super layer, batch sizes of input data of all super layers are the same, and the batch size of the input data of each super layer is determined based on a buffer requirement of a super layer with a largest buffer requirement in the neural network. It may be noted that, for a remaining super layer with a small buffer requirement in the neural network, when the layer processes input data with a same batch size, the capacity of the on-chip memory cannot be fully used. As a result, resources are wasted.

SUMMARY

Embodiments of this application provide a neural network scheduling method and apparatus, so that utilization of an on-chip storage capacity can be improved, and running performance of hardware can be improved.

According to a first aspect, an embodiment of this application provides a neural network scheduling method, where the method includes: determining a first batch size corresponding to each layer in a neural network; forming, through grouping based on the first batch size, the neural network into a neural network including at least one first layer group, where each first layer group includes at least one layer in the neural network, first batch sizes corresponding to layers in each first layer group are the same, and a buffer requirement of each first layer group is less than or equal to a capacity of an on-chip memory; forming, through grouping based on a grouping result of the first layer group, the neural network into a neural network including at least one second layer group, where each second layer group includes at least one first layer group, a buffer requirement of each second layer group is less than or equal to the capacity of the on-chip memory, and at least one second layer group includes at least two first layer groups with different first batch sizes; and scheduling the neural network based on a grouping result of the second layer group.

It should be noted that, because the neural network processes data by using an operator of a layer, input data of each layer is output data of a previous layer, and a current layer needs to perform an operation based on output data obtained by a previous layer by performing an operation. In other words, data transmission at the layer in the neural network is data-dependent. Therefore, a layer group can be obtained only by grouping adjacent layers, and a sequence of subsequently scheduling these layers is consistent with a sequence of scheduling these layers in the neural network. In other words, division of the neural network is division performed based on a sequence of layers in the neural network, and layers in a layer group obtained after grouping needs to be consecutive layers. For example, the neural network includes five layers, and L1 to L5 are sequentially arranged. L1, L2, and L3 may be grouped into a layer group, and L1 and L3 cannot be grouped into a layer group.

In this way, a batch size of each layer in the neural network is first determined based on the capacity of the on-chip memory, and then layers with a same batch size are fused into a first layer group. Subsequently, a plurality of first layer groups are fused into a second layer group based on a buffer requirement of the first layer group and the capacity of the on-chip memory. In this way, the obtained second layer group includes first layer groups with different batch sizes. In other words, when the neural network is subsequently scheduled based on the second layer group, the input data is processed based on different batch sizes. In this case, a buffer requirement of each second layer group does not exceed the capacity of the on-chip memory, utilization of the on-chip memory can be improved, and naming performance of hardware can be improved.

In a possible implementation, the determining a first batch size corresponding to each layer in a neural network includes: determining, for a buffer requirement of each layer in the neural network and the capacity of the on-chip memory, the first batch size corresponding to each layer in the neural network.

Functions implemented by different layers in the neural network may be the same or different. Operators and parameters of all layers may also be the same or different. In this case, batch sizes corresponding to the layers in the neural network may be the same or different. Therefore, the batch size corresponding to each layer needs to be determined. In a conventional technology, the layers in the neural network process data based on a same batch size. Consequently, some layers cannot fully use a memory capacity. As a result, resources are wasted, and efficiency is reduced.

For example, it is assumed that the capacity of the on-chip memory is 100. If a corresponding buffer requirement existing when L0 processes one picture is 105, it is determined that a base batch size of L0 is a half picture. If a corresponding buffer requirement existing when L1 processes one picture is 50, it is determined that a base batch size of L1 is two pictures.

In a possible implementation, the determining, for a buffer requirement of each layer in the neural network and the capacity of the on-chip memory, the first batch size corresponding to each layer in the neural network includes: determining, for one or more pieces of input data and one or more pieces of output data of each layer in the neural network and the capacity of the on-chip memory, the first batch size corresponding to each layer in the neural network, where at least one piece of input data or at least one piece of output data of at least one layer in the neural network is stored in an off-chip memory.

Each layer in the neural network may include one or more pieces of input data and one or more pieces of output data, and each group of data may be selectively stored in the on-chip memory, or may be selectively stored in the off-chip memory.

In a possible implementation, the determining, for one or more pieces of input data and one or more pieces of output data of each layer in the neural network and the capacity of the on-chip memory, the first batch size corresponding to each layer in the neural network includes: adjusting storage locations of one or more pieces of input data and/or one or more pieces of output data of at least one layer in the neural network based on operation overheads of the neural network, where the storage location includes the on-chip memory or the off-chip memory; in a process of adjusting the storage location, obtaining storage locations that are of one or more pieces of input data and one or more pieces of output data of each layer in the neural network and that exist when the operation overheads are the lowest; and determining the first batch size corresponding to each layer in the neural network based on the storage locations of the one or more pieces of input data and the one or more pieces of output data of each layer in the neural network and the capacity of the on-chip memory.

A process in which the layer in the neural network processes data includes a data transfer-in process (namely, a process of reading input data), a calculation process, and a data transfer-out process (namely, a process of storing output data). When processing a batch of data, the neural network needs to first transfer some data in, that is, executes the data transfer-in process, and overheads generated in this process are head overheads. Then, the data transfer-in process, the calculation process, and the data transfer-out process are executed in parallel. Finally, the neural network executes the data transfer-out process for data that is finally obtained by performing an operation, and stores the data in storage space, and overheads generated in this process are tail overheads.

In this case, in a process of scheduling the neural network to process data, corresponding operation overheads of the neural network are generated, for example, calculation time overheads and data transfer time overheads. Performance of the neural network may be measured by using the operation overheads of the neural network. If the operation overheads of the neural network are low, the neural network has good performance.

Optionally, whether to store data in the on-chip memory or to store data in the off-chip memory is selected based on a feature such as a high scheduling speed and a small capacity of the on-chip memory and a feature such as a low scheduling speed and a large capacity of the off-chip memory. Therefore, the operation overheads of the neural network are adjusted. For example, if a first batch size corresponding to a layer is small, at least one piece of input data and/or at least one piece of output data of the layer may be stored in the off-chip memory through adjustment, to increase the first batch size of the layer. A storage location and a batch size are adjusted, so that a storage location of each group of data and a batch size corresponding to each layer in the neural network that exist when the operation overheads of the neural network are the lowest are obtained, and the neural network is subsequently divided based on the batch size.

In a possible implementation, the forming, through grouping based on the first batch size, the neural network into a neural network including at least one first layer group includes: if a buffer requirement existing when an $i^{th}$ layer to a $j^{th}$ layer in the neural network are scheduled as a whole is greater than the capacity of the on-chip memory, and a buffer requirement existing when the $i^{th}$ layer to a $(j-1)^{th}$ layer are scheduled as a whole is less than or equal to the capacity of the on-chip memory, determining the $i^{th}$ layer to an $(i+m)^{th}$ layer as a first layer group based on the operation overheads of the neural network, where first batch sizes of the $i^{th}$ layer to the $j^{th}$ layer in the neural network are the same, i, j, and m are positive integers, and $(i+m)\leq(j-1)$.

Optionally, a grouping manner in which the neural network is formed, through grouping, into a neural network including the first layer group is determined from the first layer in the neural network based on the first batch size and the capacity of the on-chip memory. Alternatively, first, consecutive layers with a same first batch size in the neural network are determined, and these layers are separately used as grouping units, to perform the grouping step. Then, a layer group is obtained through grouping from the first layer in the grouping unit based on a sequence of scheduling layers in the neural network.

In this way, batch sizes of layers in the first layer group included in the neural network existing after grouping are the same. In this case, when the neural network is scheduled based on the first layer group, utilization of an on-chip storage capacity can be improved. Therefore, when the second layer group is subsequently obtained through grouping based on the grouping result of the first layer group, the neural network can still improve utilization of the on-chip storage capacity.

In a possible implementation, the determining the $i^{th}$ layer to an $(i+m)^{th}$ layer as a first layer group based on the operation overheads of the neural network includes: obtaining a plurality of corresponding operation overheads existing when the $i^{th}$ layer to a $t^{th}$ layer are scheduled as a whole, where the $t^{th}$ layer is any one of an $(i+1)^{th}$ layer to the $(j-1)^{th}$ layer, t is a positive integer, and $(i+1)\leq t\leq(j-1)$; and when the $i^{th}$ layer to the $(i+m)^{th}$ layer are scheduled as a whole, enabling the operation overheads of the neural network to be the lowest.

For example, it is assumed that layers (layer) in a neural network include L0, L1, L2, and L3, sizes of convolution kernels thereof are all 3*3, a stride by which the convolution kernel moves is 1, and the stride by which the convolution kernel moves is less than an edge length of the convolution kernel. L0, L1, L2, and L3 are scheduled as a whole. In a process of processing input data by using a padding algorithm, an overlap problem exists. That layers are scheduled as a whole may also be understood as follows: After the neural network is divided, the layers in the whole are scheduled as a layer group. L0 to L2 are grouped into a whole for scheduling, and a buffer requirement is less than or equal to the capacity of the on-chip memory. It is assumed that after L3 is grouped into the whole obtained by grouping L0 to L2, that is, after L0 to L3 are grouped into a whole, because the padding algorithm is used to perform an operation, a current buffer requirement is greater than the capacity of the on-chip memory. Therefore, L3 cannot be grouped into the whole obtained by grouping L0 to L2, to prevent a data amount in an operation process from exceeding the capacity of the on-chip memory. In addition, grouping manners of L0 to L2 are adjusted based on the operation overheads of the neural network. In an adjustment process, the operation overheads of the neural network are reduced. For example, t=1, t=2, and two corresponding operation overheads are obtained. If operation overheads of the neural network that exist when L0 and L1 are determined as a first layer group are less than operation overheads of the neural network that exist when L0 to L2 are determined as a first layer group, L0 and L1 are determined as a first layer group, that is, m=1, the first layer and the second layer in the neural network are determined as a first layer group.

In a possible implementation, the forming, through grouping based on a grouping result of the first layer group, the neural network into a neural network including at least one second layer group includes: if a buffer requirement existing when an $a^{th}$ first layer group to a $b^{th}$ first layer group in the neural network are scheduled as a whole is greater than the capacity of the on-chip memory, and a buffer requirement existing when the $a^{th}$ first layer group to a $(b-1)^{th}$ first layer group are scheduled as a whole is less than or equal to the capacity of the on-chip memory, determining the $a^{th}$ first layer group to the $b^{th}$ first layer group as a second layer group based on the operation overheads of the neural network, or determining the $a^{th}$ first layer group to the $(b-1)^{th}$ first layer group as a second layer group based on the operation overheads of the neural network, where at least two first layer groups corresponding to different first batch sizes exist in the $a^{th}$ first layer group to the $b^{th}$ first layer group in the neural network, and a and b are positive integers.

Optionally, first layer groups that are adjacent to each other and whose first batch sizes are in a multiple relationship may be grouped into a second layer group. For example, it is assumed that a first batch size corresponding to the initial first layer group is two pictures, a first batch size corresponding to the second first layer group is eight pictures, the second first layer group is adjacent to the initial first layer group, and the first batch size thereof is three times the first batch size corresponding to the initial first layer group. In this case, if a buffer requirement existing when the initial first layer group and the second first layer group are used as a whole is less than or equal to the capacity of the on-chip memory, the two first layer groups may be grouped into a second layer group.

Optionally, first layer groups included in the neural network are sequentially traversed from the initial first layer group included in the neural network, to form, through grouping, the neural network into a neural network including at least one second layer group. For example, after the initial first layer group and the second first layer group are grouped into a whole, it is determined whether a buffer requirement of a current grouping whole exceeds the capacity of the on-chip memory. If the buffer requirement of the whole obtained by grouping the initial first layer group and the second first layer group exceeds the capacity of the on-chip memory, the initial first layer group is grouped into a second layer group, and grouping continues to be performed from the second first layer group, to obtain a next second layer group. If the initial first layer group and the second first layer group are grouped into a whole and a buffer requirement of a current grouping whole does not exceed the capacity of the on-chip memory, the initial first layer group and the second first layer group are grouped into a second layer group. Then, it is determined whether a buffer requirement of a current grouping whole existing after the third first layer group is grouped into the whole including the initial first layer group and the second first layer group exceeds the capacity of the on-chip memory. In this way, the foregoing steps are cyclically performed, and after all the first layer groups included in the neural network are traversed, the neural network is formed, through grouping, into a neural network including at least one second layer group.

In this way, when the neural network existing after grouping is scheduled based on the second layer group, utilization of an on-chip storage capacity can be improved, and running performance of hardware can be improved.

In a possible implementation, the method further includes: if the $a^{th}$ first layer group to the $b^{th}$ first layer group are determined as a second layer group, reducing a first batch size corresponding to the $b^{th}$ first layer group or the $(b-1)^{th}$ first layer group.

When the $a^{th}$ first layer group to the first layer group are scheduled as a whole, a corresponding buffer requirement already exceeds the capacity of the on-chip memory. Therefore, the buffer requirement may be lowered by reducing the first batch size corresponding to the $b^{th}$ first layer group or the $(b-1)^{th}$ first layer group, to ensure that a buffer requirement of the determined second layer group does not exceed the capacity of the on-chip memory.

For example, it is assumed that a first batch size corresponding to the initial first layer group is two pictures, and a first batch size corresponding to the second first layer group is six pictures. If the two first layer groups are grouped into a whole, the initial first layer group is scheduled to perform an operation three times, and the second first layer group needs to be scheduled to perform an operation only one time. Due to a gather problem, a layer in the initial first layer group generates an additional buffer requirement for the on-chip memory. Consequently, a buffer requirement of a second layer group is greater than the capacity of the on-chip memory. In this case, the first batch size corresponding to the second first layer group may be reduced, for example, the size is reduced to four pictures. In this case, the additional buffer requirement of the layer in the initial first layer group for the on-chip memory is correspondingly lowered, the two first layer groups may be grouped into a second layer group, and the buffer requirement of the second layer group is less than or equal to the capacity of the on-chip memory.

In a possible implementation, the determining the $a^{th}$ first layer group to the $b^{th}$ first layer group as a second layer group based on the operation overheads of the neural network, or determining the $a^{th}$ first layer group to the $(b-1)^{th}$ first layer group as a second layer group includes: when the $a^{th}$ first layer group to the $b^{th}$ first layer group are scheduled as a whole, enabling the operation overheads of the neural network to be first operation overheads, or when the $a^{th}$ first layer group to the $(b-1)^{th}$ first layer group are scheduled as a whole, enabling the operation overheads of the neural network to be second operation overheads; and if the first operation overheads are less than the second operation overheads, determining the $a^{th}$ first layer group to the $b^{th}$ first layer group as a second layer group, or if the second overheads are less than the first operation overheads, determining the $a^{th}$ first layer group to the $(b-1)^{th}$ first layer group as a second layer group.

In this way, when the neural network existing after grouping is scheduled based on the second layer group, the operation overheads of the neural network are the lowest, utilization of an on-chip storage capacity is improved, and running performance of hardware is improved.

In a possible implementation, in a process of scheduling the neural network based on the grouping result of the second layer group, a sequence of scheduling layers in the second layer group is determined based on a sequence of scheduling first layer groups included in the second layer group and a sequence of scheduling layers in the first layer group.

In a possible implementation, the sequence of scheduling the layers in the first layer group is the same as a sequence of scheduling layers in the neural network existing before grouping, and the sequence of scheduling the first layer groups included in the second layer group is determined based on the first batch size and a sequence of scheduling the first layer and the last layer in the first layer group.

For example, the neural network includes six convolutional layers L1 to L6, and a scheduling sequence existing before grouping is L1→L2→L3→L4→L5→L6. L1 to L3 form a first layer group, and a corresponding first batch size is two pictures. L4 to L6 form a first layer group, and a corresponding first batch size is four pictures. The two first layer groups are two consecutive first layer groups, and the corresponding first batch sizes are in a multiple relationship. After the two first layer groups are grouped into a second layer group, a buffer requirement of the second layer group is less than or equal to the capacity of the on-chip memory. In this case, input data of the neural network is processed based on a grouping result of the second layer group. The input data is input into L1. The input data is A0 and B0, and corresponding first batch sizes are respectively two pictures. A scheduling sequence of the initial first layer group (L1 to L3) is L1→L2→L3, and a scheduling sequence of the second first layer group (L4 to L6) is L4→L5→L6. It is determined, based on the first batch size, that the initial first layer group needs to be scheduled two times, the second first layer group needs to be correspondingly scheduled only one time, and L3 in the neural network existing before grouping is scheduled before L4. In this case, a sequence of scheduling the layers in the neural network existing after grouping is L1→L2→L3→L1→L2→L3→L4→L5→L6.

In a possible implementation, at least one piece of input data or at least one piece of output data of the layer included in the second layer group is stored in the on-chip memory, and input data of the first layer and output data of the last layer in the second layer group are stored in the off-chip memory.

In other words, it may be ensured that at least one piece of data in the second layer group obtained after grouping is quickly stored in the on-chip memory, to improve operation efficiency, and improve utilization of the on-chip memory. In addition, input data and output data of the second layer group obtained after grouping are stored in the off-chip memory, to ensure that the buffer requirement of the second layer does not exceed the capacity of the on-chip memory.

According to a second aspect, an embodiment of this application provides a neural network scheduling apparatus, where the apparatus may include a determining unit, a grouping unit, and a scheduling unit. The determining unit is configured to determine a first batch size corresponding to each layer in a neural network. The grouping unit is configured to form, through grouping based on the first batch size, the neural network into a neural network including at least one first layer group, where each first layer group includes at least one layer in the neural network, first batch sizes corresponding to layers in each first layer group are the same, and a buffer requirement of each first layer group is less than or equal to a capacity of an on-chip memory. The grouping unit it is further configured to form, through grouping based on a grouping result of the first layer group, the neural network into a neural network including at least one second layer group, where each second layer group includes at least one first layer group, a buffer requirement of each second layer group is less than or equal to the capacity of the on-chip memory, and at least one second layer group includes at least two first layer groups with different first batch sizes. The scheduling unit is configured to schedule the neural network based on a grouping result of the second layer group.

In a possible implementation the determining unit is specifically configured to determine, for a buffer requirement of each layer in the neural network and the capacity of the on-chip memory, the first batch size corresponding to each layer in the neural network.

In a possible implementation, the determining unit is specifically configured to determine, for one or more pieces of input data and one or more pieces of output data of each layer in the neural network and the capacity of the on-chip memory, the first batch size corresponding to each layer in the neural network, where at least one piece of input data or at least one piece of output data of at least one layer in the neural network is stored in an off-chip memory.

In a possible implementation, the determining unit is specifically configured to: adjust storage locations of one or more pieces of input data and/or one or more pieces of output data of at least one layer in the neural network based on operation overheads of the neural network, where the storage location includes the on-chip memory or the off-chip memory; in a process of adjusting the storage location, obtain storage locations that are of one or more pieces of input data and one or more pieces of output data of each layer in the neural network and that exist when the operation overheads of the neural network are the lowest; and determine the first batch size corresponding to each layer in the neural network based on the storage locations of the one or more pieces of input data and the one or more pieces of output data of each layer in the neural network and the capacity of the on-chip memory.

In a possible implementation, the grouping unit is specifically configured to: if a buffer requirement existing when an $i^{th}$ layer to a $j^{th}$ layer in the neural network are scheduled as a whole is greater than the capacity of the on-chip memory, and a buffer requirement existing when the $i^{th}$ layer to a $(j-1)^{th}$ layer are scheduled as a whole is less than or equal to the capacity of the on-chip memory, determine the $i^{th}$ layer to an $(i+m)^{th}$ layer as a first layer group based on the operation overheads of the neural network, where first batch sizes of the $i^{th}$ layer to the $j^{th}$ layer in the neural network are the same, i, j, and m are positive integers, and $(i+m)\leq(j-1)$.

In a possible implementation, the grouping unit is specifically configured to: obtain a plurality of corresponding operation overheads existing when the $i^{th}$ layer to a $t^{th}$ layer are scheduled as a whole, where the $t^{th}$ layer is any one of an $(i+1)^{th}$ layer to the $(j-1)^{th}$ layer, t is a positive integer, and $(i+1)\leq t\leq(j-1)$; and when the $i^{th}$ layer to the $(i+m)^{th}$ layer are scheduled as a whole, enable the operation overheads of the neural network to be the lowest.

In a possible implementation, the grouping unit is specifically configured to: if a buffer requirement existing when an $a^{th}$ first layer group to a $b^{th}$ first layer group in the neural network are scheduled as a whole is greater than the capacity of the on-chip memory, and a buffer requirement existing when the $a^{th}$ first layer group to a $(b-1)^{th}$ first layer group are scheduled as a whole is less than or equal to the capacity of the on-chip memory, determine the $a^{th}$ first layer group to the $b^{th}$ first layer group as a second layer group based on the operation overheads of the neural network, or determine the $a^{th}$ first layer group to the $(b-1)^{th}$ first layer group as a second layer group based on the operation overheads of the neural network, where at least two first layer groups corresponding to different first batch sizes exist in the $a^{th}$ first layer group to the $b^{th}$ first layer group in the neural network, and a and b are positive integers.

In a possible implementation, the grouping unit is further configured to: if the $a^{th}$ first layer group to the $b^{th}$ first layer group are determined as a second layer group, reduce a first batch size corresponding to the $b^{th}$ first layer group or the $(b-1)^{th}$ first layer group.

In a possible implementation, the grouping unit is specifically configured to: when the $a^{th}$ first layer group to the $b^{th}$ first layer group are scheduled as a whole, enable the operation overheads of the neural network to be first operation overheads, or when the $a^{th}$ first layer group to the $(b-1)^{th}$ first layer group are scheduled as a whole, enable the operation overheads of the neural network to be second operation overheads; and if the first operation overheads are less than the second operation overheads, determine the $a^{th}$ first layer group to the $b^{th}$ first layer group as a second layer group, or if the second overheads are less than the first operation overheads, determine the $a^{th}$ first layer group to the $(b-1)^{th}$ first layer group as a second layer group.

In a possible implementation, in a process of scheduling the neural network based on the grouping result of the second layer group, a sequence of scheduling layers in the second layer group is determined based on a sequence of scheduling first layer groups included in the second layer group and a sequence of scheduling layers in the first layer group.

In a possible implementation, the sequence of scheduling the layers in the first layer group is the same as a sequence of scheduling layers in the neural network existing before grouping, and the sequence of scheduling the first layer groups included in the second layer group is determined based on the first batch size and a sequence of scheduling the first layer and the last layer in the first layer group.

In a possible implementation, at least one piece of input data or at least one piece of output data of the layer included in the second layer group is stored in the on-chip memory, and input data of the first layer and output data of the last layer in the second layer group are stored in the off-chip memory.

Optionally, the neural network scheduling apparatus in the second aspect may further include a receiving unit and a sending unit. The receiving unit is configured to receive a signal sent by another apparatus, for example, receive input data. The sending unit is configured to send a signal to another apparatus, for example, send output data. The another apparatus may include, for example, another terminal device or network device.

It should be noted that the sending unit and the receiving unit may be integrated together, for example, a transceiver unit that is implemented by a transceiver or a transceiver-related circuit component. Specific implementations of the receiving unit and the sending unit are not specifically limited in this embodiment of this application.

Optionally, the communication apparatus in the second aspect may further include a storage unit, and the storage unit stores a program or instructions. When the determining unit, the grouping unit, and the scheduling unit execute the program or the instructions, the neural network scheduling apparatus in the second aspect may perform the neural network scheduling method in the first aspect.

It should be noted that the neural network scheduling apparatus in the second aspect may be a communication device, or may be a chip (system), a hardware circuit, another part or component that may be disposed in the communication device. This is not limited in this application.

In addition, for technical effects of the neural network scheduling apparatus in the second aspect, refer to technical effects of the neural network scheduling method in the first aspect. Details are not described herein again.

According to a third aspect, an embodiment of this application provides a neural network scheduling apparatus, where the apparatus has a function of implementing the neural network scheduling method in any one of the implementations of the first aspect. The function may be implemented by hardware, or may be implemented by hardware executing corresponding software. The hardware or the software includes one or more units corresponding to the foregoing function.

According to a fourth aspect, an embodiment of this application provides a neural network scheduling apparatus, including a processor and a memory, where the memory is configured to store computer execution instructions. When the neural network scheduling apparatus runs, the processor executes the computer execution instructions stored in the memory, so that the neural network scheduling apparatus performs the neural network scheduling method in any one of the first aspect or the optional implementations of the first aspect.

According to a fifth aspect, an embodiment of this application provides a neural network scheduling apparatus, including a processor, where the processor is configured to: after being coupled to a memory and reading instructions in the memory, perform the neural network scheduling method in any one of the implementations of any one of the foregoing aspects based on the instructions.

According to a sixth aspect, an embodiment of this application provides a neural network scheduling apparatus, where the apparatus includes a processor, a memory, and a communication interface. The memory is configured to store one or more programs. The one or more programs include computer execution instructions. When the apparatus runs, the processor executes the computer execution instructions stored in the memory, so that the apparatus performs the neural network scheduling method in any one of the first aspect or the optional implementations of the first aspect.

According to a seventh aspect, an embodiment of this application provides a neural network scheduling apparatus, where the apparatus may be a chip system, and the chip system includes a processor, may further include a memory, and is configured to implement a function of the neural network scheduling method in any one of the first aspect or the optional implementations of the first aspect. The chip system may include a chip, or include a chip and another discrete device.

According to an eighth aspect, an embodiment of this application provides a neural network scheduling apparatus, where the apparatus may be a circuit system, the circuit system includes a processing circuit, and the processing circuit is configured to perform the neural network scheduling method in any one of the implementations of any one of the foregoing aspects.

According to a ninth aspect, an embodiment of this application provides a computer-readable storage medium. The computer-readable storage medium stores instructions. When a computer executes the instructions, the computer performs the neural network scheduling method in any one of the first aspect or the optional implementations of the first aspect.

According to a tenth aspect, an embodiment of this application provides a computer program product including instructions. When the computer program product runs on a computer, the computer is enabled to perform the neural network scheduling method in any one of the first aspect or the optional implementations of the first aspect.

DESCRIPTION OF EMBODIMENTS

With reference to the accompanying drawings, the following describes in detail a neural network scheduling method and apparatus provided in embodiments of this application.

Figure 1:
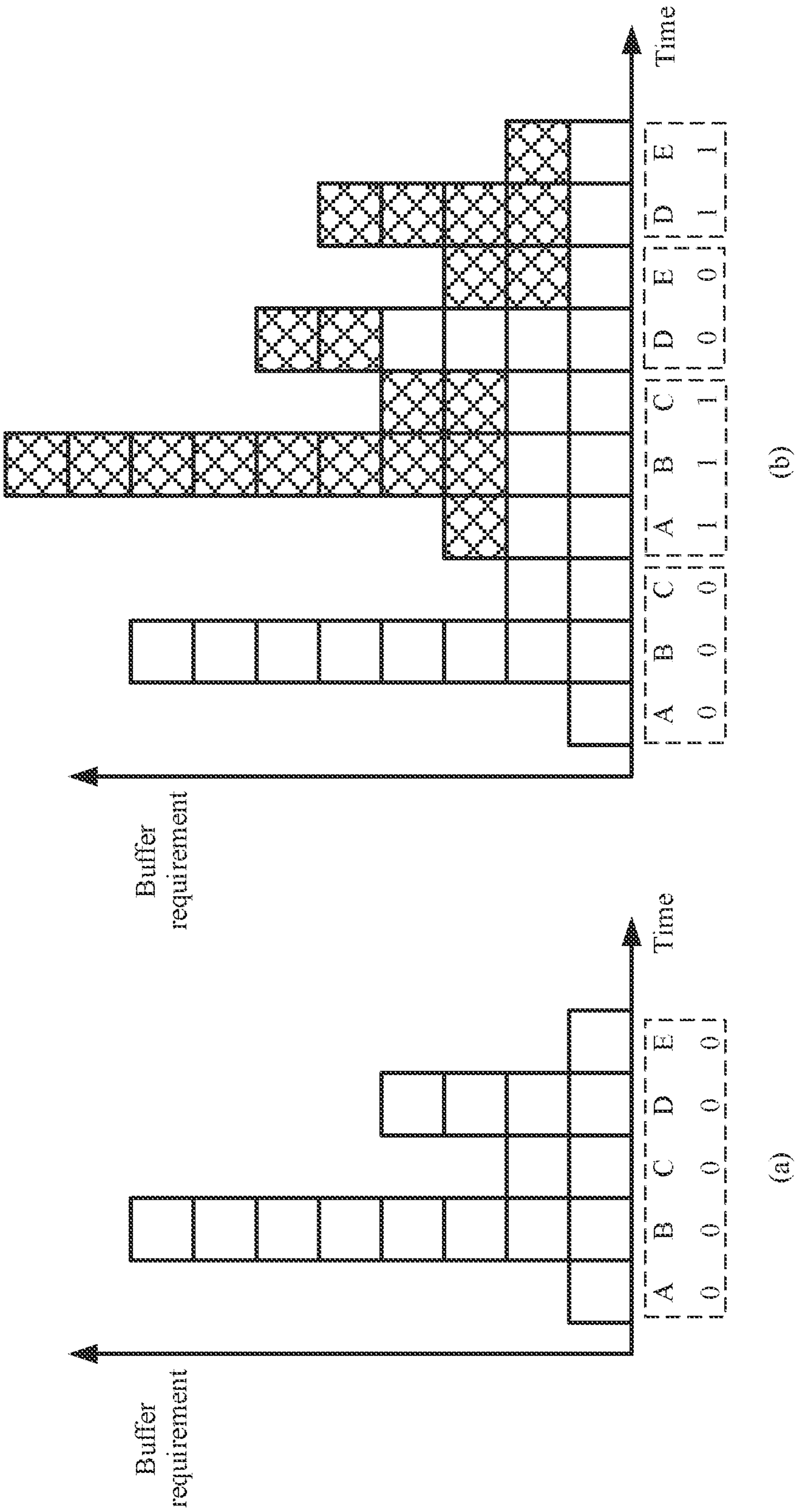
FIG. 1 is a schematic diagram of a neural network scheduling method in a conventional technology according to an embodiment of this application.
Figure 2A:
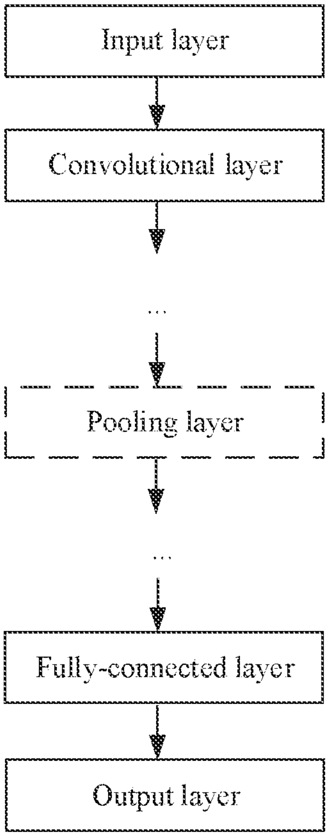
FIG. 2A is a schematic diagram of a structure of a neural network according to an embodiment of this application.

Generally, a neural network includes an input layer, a hidden layer, and an output layer. For example, FIG. 2A is a schematic diagram of a structure of a neural network.

The input layer in the neural network may process multi-dimensional data. Image processing is used as an example. The input layer may receive a pixel value (a three-dimensional array) of an image, namely, a two-dimensional pixel on a plane and a value of an RGB channel.

The hidden layer in the neural network includes one or more convolutional layers (convolutional layer), one or more pooling layers (pooling layer), and one or more fully-connected layers (fully-connected layer). Generally, one or more convolutional layers are followed by one pooling layer. In some examples, the hidden layer in the neural network may not include the pool layer.

The output layer in the neural network has a same structure and working principle as an output of a conventional feedforward neural network. For example, for a graphic classification neural network, the output layer outputs a classification label by using a logical function or a normalized exponential function (soft max function), for example, a person, a scene, and an object. For an object recognition neural network, the output layer may be designed to output a center coordinate, a size, classification, and the like of an object.

In technical solutions provided in the embodiments of this application, based on a specific structure of a neural network model, in a process of performing an operation by using the neural network, feature data and weight data between every two layers of the neural network are stored in storage space. For example, during a forward operation, when performing an operation, each layer needs to request one layer of data from a previous layer, that is, read data from the storage space. After performing the operation, the layer stores the data in the storage space as input data of a next layer. Similarly, during a reverse operation, before performing an operation, a current layer invokes data that is output by a next layer to the storage space. To be specific, in a process of performing an operation by using the neural network, each layer in the neural network generates a corresponding buffer requirement of input data and a corresponding buffer requirement of output data, and needs to interact with the storage space to invoke or store data. Therefore, both a size of the storage space and power consumed by invoking data affect performance of processing data by the neural network. The storage space includes an on-chip memory and an off-chip memory.

Figure 2B:
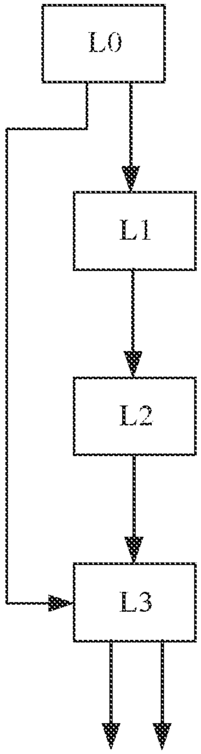
FIG. 2B is a schematic diagram of an input/output manner of a neural network according to an embodiment of this application.

Each layer of the hidden layer in the neural network corresponds to one or more pieces of input data and one or more pieces of output data. For example, referring to FIG. 2B, L0 includes two groups of output data that are respectively output to L1 and L3. Therefore, L3 includes two groups of input data that are respectively output data of L0 and L2. Correspondingly, L3 also generates two groups of output data. In the embodiments of this application, a storage location of each piece of input data or each piece of output data of each layer includes the on-chip memory or the off-chip memory.

Figure 3:
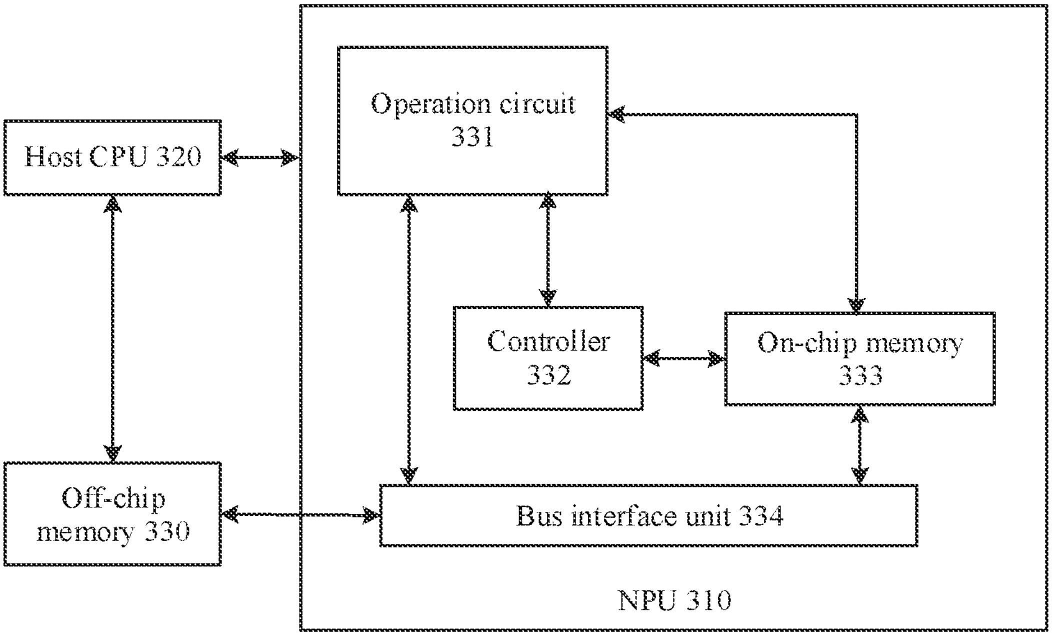
FIG. 3 is a schematic diagram of a structure of an apparatus according to an embodiment of this application.

FIG. 3 is a schematic diagram of a structure of an apparatus according to an embodiment of this application. The apparatus may be an electronic device or a server that runs the foregoing neural network, or may be a component (such as a chip system or a circuit system) in the electronic device or the server that runs the foregoing neural network, to implement a specified function.

The foregoing specified function may be, for example, an application in terms of computer vision such as image classification (image classification), object recognition (object recognition), action recognition (action recognition), pose estimation (pose estimation), and neural style transfer (neural style transfer), or may be an application in terms of natural language processing (natural language processing, NLP).

The apparatus includes a neural-network processing unit (neural-network processing units, NPU) 310, a host central processing unit (central processing unit, CPU) (host CPU) 320, and an off-chip memory 330.

The neural-network processing unit NPU 310 is mounted to the host CPU 320 as a coprocessor for task allocation. A core part of the NPU 310 is an operation circuit 331, and a controller 332 controls the operation circuit 331 to extract data from an on-chip (On-Chip) memory 333 and perform an operation.

In some implementations, the operation circuit 331 includes a plurality of processing units (process engine, PE). In some other implementations, the operation circuit 331 is a two-dimensional systolic array. Alternatively, the operation circuit 331 may be a one-dimensional systolic array or another electronic circuit that can perform a mathematical operation such as multiplication and addition. In some other implementations, the operation circuit 331 is a general-purpose matrix processor.

For example, it is assumed that an input matrix A, a weight matrix B, and an output matrix C exist. The operation circuit 331 extracts data corresponding to the matrix B from the on-chip memory 333, and buffers the data on each PE in the operation circuit 331. The operation circuit 331 extracts data of the matrix A from the on-chip memory 333, performs a matrix operation on the data of the matrix A and the matrix B, and stores an obtained partial result or final result of a matrix in the on-chip memory 333.

A bus interface unit 334 (bus interface unit, BIU) is configured to implement interaction between the host CPU 320, the off-chip memory 330 the operation circuit 331, and the on-chip memory 333 by using a bus.

Generally, the on-chip memory 333 may also be referred to as a cache, and may include one or more independent caches or processing units having a data cache capability, for example, a unified memory, an input memory, a weight memory, and a fetch memory. In addition, the off-chip memory 330 may be accessed under control of the controller 332. The on-chip memory 333 may be a static access memory with a high speed and a small capacity, for example, a static random access memory (static random access memory, SRAM).

In some embodiments, input data and/or output data of the operation circuit 331 are/is stored in the on-chip memory 333, and a running speed of the neural network may be improved by using a feature such as the high interaction speed of the on-chip memory 333. However, due to a limitation of the small capacity of the on-chip memory 333, a quantity of times of interaction may need to be increased. This increases power consumption.

The off-chip memory 330 is a memory external to the NPU, and may include one or more independent memories or processing units having a data storage capability. The off-chip memory 330 is a dynamic access memory with a low speed and a large capacity, for example, may be a double data rate synchronous dynamic random access memory (double data rate synchronous dynamic random access memory, DDR SDRAM), a high bandwidth memory (high bandwidth memory, HBM), or another readable and writable memory.

In some embodiments, input data and/or output data of the operation circuit 331 are/is stored in the off-chip memory 330, and a large amount of data may be processed by using a feature such as the large capacity of the off-chip memory 330. However, due to the low speed of the off-chip memory 330, processing efficiency of the neural network is low.

To facilitate understanding of the technical solutions provided in the embodiments of this application, some terms in the embodiments of this application are first described:

(1) Layer Group

That the neural network includes a plurality of hidden layers has been described above, and may be described as follows: The neural network includes a plurality of layers arranged in a directed graph, and each layer may have a corresponding parameter set. Each layer group may be obtained by dividing a directed graph and includes one or more layers.

The layer group may also be described as a super layer (super layer), a graph (graph), or the like, and represents that the layer group includes one layer or a plurality of consecutive layers in the neural network.

In some examples, the neural network is scheduled based on a layer group to process input data, and a sequence of scheduling layers in the layer group is the same as a sequence of scheduling layers in the neural network.

(2) Batch Size (Batch Size)

Due to a limitation of a capacity of an on-chip memory, a maximum amount of data that can be processed by each layer in the neural network is a batch size corresponding to the layer. For example, the capacity of the on-chip memory is 100. If a size of a buffer requirement generated when L1 (layer 1) processes one picture is 60, a maximum of one picture is processed each time L1 is scheduled, and a batch size corresponding to L1 is one picture. If a size of a data buffer requirement generated when L2 processes one picture is 30, a maximum of three pictures are processed each time L2 is scheduled, and a batch size corresponding to L2 is three pictures.

It may be understood that functions implemented by different layers in the neural network may be the same or different. Operators and parameters of all layers may also be the same or different. In this case, batch sizes corresponding to the layers in the neural network may be the same or different.

(3) Overlay (Overlap) Problem

In some scenarios in which the neural network processes a picture, due to the limitation of the capacity of the on-chip memory, complete-picture data may need to be divided into two or more pieces of data as a batch of input data, and each piece of data may be referred to as non-complete-picture data. The convolutional layer may process input data of a non-complete picture by using a padding algorithm. To be specific, before calculation is performed by using a convolution kernel, a size of the input data is manually increased by using the padding algorithm, to offset an impact caused by size reduction in calculation. The padding algorithm may be, for example, zero padding, overlap padding, or another method. In other words, if the input data is non-complete-picture data, the input data needs to be processed by using the padding algorithm. If the input data is complete-picture data, the input data does not need to be processed by using the padding algorithm.

The padding algorithm is used as an example. If the convolutional layer uses the padding algorithm, when the convolutional layer is explained, the input data needs to be padded before being flattened. When a stride (stride) by which the convolution kernel moves is less than an edge length of the convolution kernel (which is generally a square), overlap (overlap) occurs between areas of the convolution kernel and an action range of an original input matrix. When a stride (stride) by which the convolution kernel moves is the same as an edge length of the convolution kernel, no overlap occurs. If the size of the input data is (w*w), a size of data obtained after padding is (w+k−s)*(w+k−s), where k represents the edge length of the convolution kernel, s represents the stride by which the convolution kernel moves, and padding data is (k−s).

Figure 4:
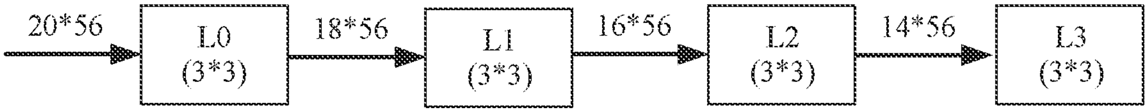
FIG. 4 is a schematic diagram of a process in which a neural network processes data according to an embodiment of this application.

For example, referring to FIG. 4, it is assumed that layers (layer) in a neural network include L0, L1, L2, and L3, sizes of convolution kernels thereof are all 3*3, a stride by which the convolution kernel moves is 1, and the stride by which the convolution kernel moves is less than an edge length of the convolution kernel. L0, L1, L2, and L3 are scheduled as a whole. In a process of processing input data by using the padding algorithm, an overlap problem exists. That layers are scheduled as a whole may also be understood as follows: After the neural network is divided, the layers in the whole are scheduled as a layer group.

For example, a size of a complete picture is 56*56, and a quantity of rows of the complete picture is divided into four pieces for processing. If L0 to L2 are scheduled as a layer group, it needs to be ensured that L2 outputs 14 rows of data, that is, a size of output data of the layer group is 14*56, to ensure that L3 can process one quarter row of pictures. In this case, input data of L2 needs to be padded with two rows of data, that is, a size of the input data is 16*56. Correspondingly, a size of input data corresponding to L1 is 18*56, and a size of input data corresponding to L0 is 20*56. In other words, in a process of performing division processing on the complete picture, to ensure the size of the output data, a buffer requirement of the layer in the layer group increases. In addition, a larger quantity of layers in the layer group indicates a larger amount of data with which a previous layer needs to be padded. If the capacity of the on-chip memory is small, a size of the layer group is limited.

(4) Gather (Gather) Problem and Scatter (Scatter) Problem

When a plurality of layers and/or layer groups with different batch sizes (batch size) in the neural network are scheduled as a layer group, that is, are scheduled as a whole, some data is reserved in buffer space of the on-chip memory, and therefore an additional buffer requirement for the on-chip memory is generated.

Figure 5:
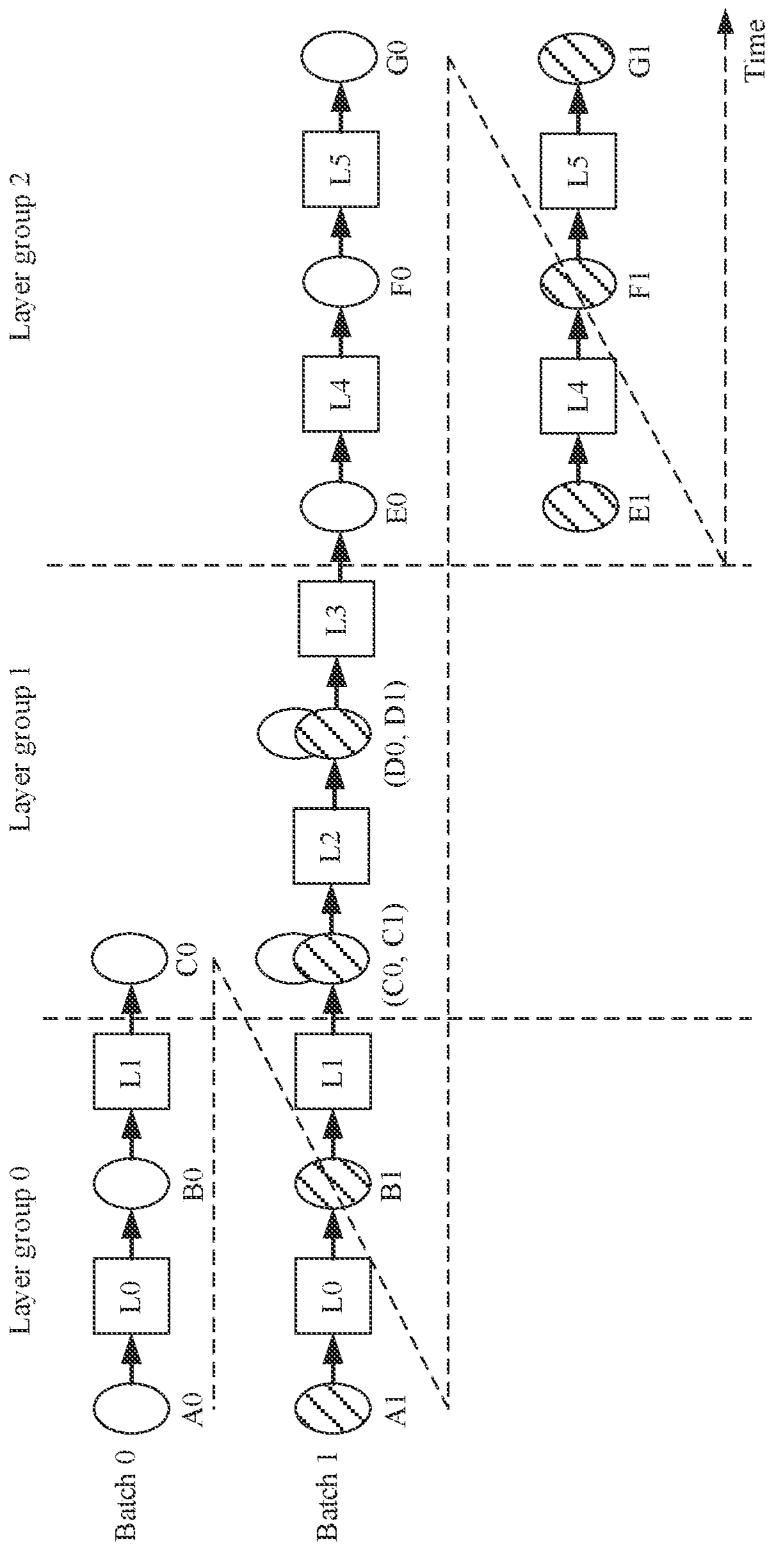
FIG. 5 is a first schematic diagram of a neural network scheduling scenario according to an embodiment of this application.

For example, as shown in FIG. 5, it is assumed that the neural network includes six layers, a layer sequence is L0 to L5 (a layer 0 to a layer 5), batch sizes corresponding to L0, L1, L4, and L5 are 1, batch sizes corresponding to L2 and L3 are 2, and input data is a batch 0 (batch 0) and a batch 1 (batch 1) whose batch sizes are 1. In FIG. 5, a blank ellipse is used to represent that the layer in the neural network processes input data and output data that correspond to the batch 0, and a slash-filled ellipse is used to represent that the layer in the neural network processes input data and output data that correspond to the batch 1. The neural network is divided, that is, one or more layers are grouped into a layer group based on a sequence of scheduling layers in the neural network. Subsequently, based on a grouping result, the neural network is scheduled based on a layer group. L0 and L1 with a same batch size are grouped into a layer group 0, L2 and L3 with a same batch size are grouped into a layer group 1, and L4 and L5 with a same batch size are grouped into a layer group 2.

It should be noted that, because the neural network processes data by using an operator of a layer, input data of each layer is output data of a previous layer, and a current layer needs to perform an operation based on output data obtained by a previous layer by performing an operation. In other words, data transmission at the layer in the neural network is data-dependent. Therefore, a layer group can be obtained only by grouping adjacent layers, and a sequence of subsequently scheduling these layers is consistent with a sequence of scheduling these layers in the neural network. In other words, division of the neural network is division performed based on a sequence of layers in the neural network, and layers in a layer group obtained after grouping needs to be consecutive layers. For example, the neural network includes five layers, and L1 to L5 are sequentially arranged. L1, L2, and L3 be grouped into a layer group, and L1 and L3 cannot be grouped into a layer group.

Currently, the neural network needs to process the batch 0 and the batch 1. If the layer group 0 and the layer group 1 are grouped into a layer group for scheduling, a gather problem may occur. As shown in FIG. 5, if batch sizes corresponding to L0 and L1 are 1, input data whose data size is 1 may be processed by the layer group 0 each time, that is, the batch 0 and the batch 1 are separately processed. After the batch 0 is input to L0, L0 and L1 perform processing, and output data of L1 is C0. A batch size corresponding to L2 is 2. In this case, C0 only corresponds to the batch 0, a processing requirement of L2 is not met, and C0 needs to be temporarily stored in the on-chip memory. The batch 1 is input to L0 for processing, L0 and L1 perform processing, and output data of L1 is C1. In this case, L1 outputs two batches of data, and the processing requirement of L2 is met. The on-chip memory includes two groups of data C0 and C1. After C0 and C1 are aggregated, L2 may invoke the aggregated C0 and C1 for processing. Therefore, if the layer group 0 and the layer group 1 are grouped into a layer group, in a process of scheduling L0 and L1 to process the batch 1, C0 occupies the buffer space of the on-chip memory, and a data amount corresponding to C0 is an additional buffer requirement of L0 and L1 for the on-chip memory. In this process, a buffer requirement of input data corresponding to L0 is a data amount corresponding to (C0+A1), and a buffer requirement of output data is a data amount corresponding to (C0+B1). A buffer requirement of input data corresponding to L1 is a data amount corresponding to (C0+B1), and a buffer requirement of output data is a data amount corresponding to (C0+C1).

If the layer group 1 and the layer group 2 are grouped into a layer group for scheduling, a scatter problem may occur. As shown in FIG. 5, input data of L3 is D0 corresponding to the batch 0 and D1 corresponding to the batch 1, and output data is E0 corresponding to the batch 0 and E1 corresponding to the batch 1. If a batch size corresponding to L4 is 1, E0 and E1 cannot be processed simultaneously. In this case, L4 first processes the E0, and temporarily stores E1 in the on-chip memory. In this case, in a process of scheduling L4 and L5 to process data corresponding to the batch 0, E1 occupies the buffer space of the on-chip memory, and a data amount corresponding to E1 is an additional buffer requirement of L4 and L5 for the on-chip memory. In this process, a buffer requirement of input data corresponding to L4 is a data amount corresponding to (E1+E0), and a buffer requirement of output data is a data amount corresponding to (E1+F0). A buffer requirement of input data corresponding to L5 is a data amount corresponding to (E1+F0), and a buffer requirement of output data is a data amount corresponding to (E1+G0).

Therefore, in a process of grouping layers and/or layer groups with different batch sizes, the additional buffer requirement for the on-chip memory due to the gather or scatter problem needs to be considered, to determine whether a buffer requirement of a layer group obtained after grouping exceeds the capacity of the on-chip memory.

(5) Operation Overheads of a Neural Network

In a process of scheduling the neural network to process data, corresponding operation overheads of the neural network are generated, for example, calculation time overheads and data transfer time overheads. Performance of the neural network may be measured by using the operation overheads of the neural network. If the operation overheads of the neural network are low the neural network has good performance.

Figure 6:
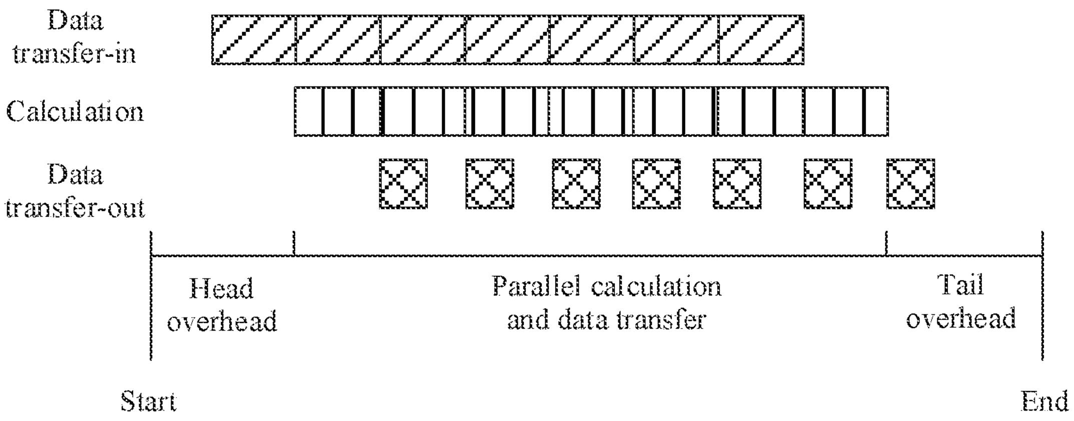
FIG. 6 is a schematic diagram of operation overheads of a neural network according to an embodiment of this application.

For example, as shown in FIG. 6, a process in which the layer in the neural network processes data includes a data transfer-in process (namely, a process of reading input data), a calculation process, and a data transfer-out process (namely, a process of storing output data). When processing a batch of data, the neural network needs to first transfer some data in, that is, executes the data transfer-in process, and overheads generated in this process are head overheads. Then, the data transfer-in process, the calculation process, and the data transfer-out process are executed in parallel. Finally, the neural network executes the data transfer-out process for data that is finally obtained by performing an operation, and stores the data in storage space, and overheads generated in this process are tail overheads.

In the embodiments of this application, the layer processes data based on a batch size. In a process in which a layer processes a batch of input data, calculation time=calculation amount of the layer/calculation capability of a chip provided with the neural network, data transfer time=(amount of input data+amount of output data)/(bandwidth of the on-chip memory or bandwidth of the off-chip memory), and total time overheads=head overheads+max (calculation time, data transfer time)+tail overheads. It may be learned that, if the batch size is excessively small, a time corresponding to the head overheads and the tail overhead may be greater than or equal to the calculation time, and consequently operation efficiency of the neural network is low. Time overheads of a layer in the neural network may be obtained based on a storage location of input data and/or output data of the current layer and the calculation capability of the chip provided with the neural network. The storage location of the data includes the on-chip memory and the off-chip memory.

Figure 7:
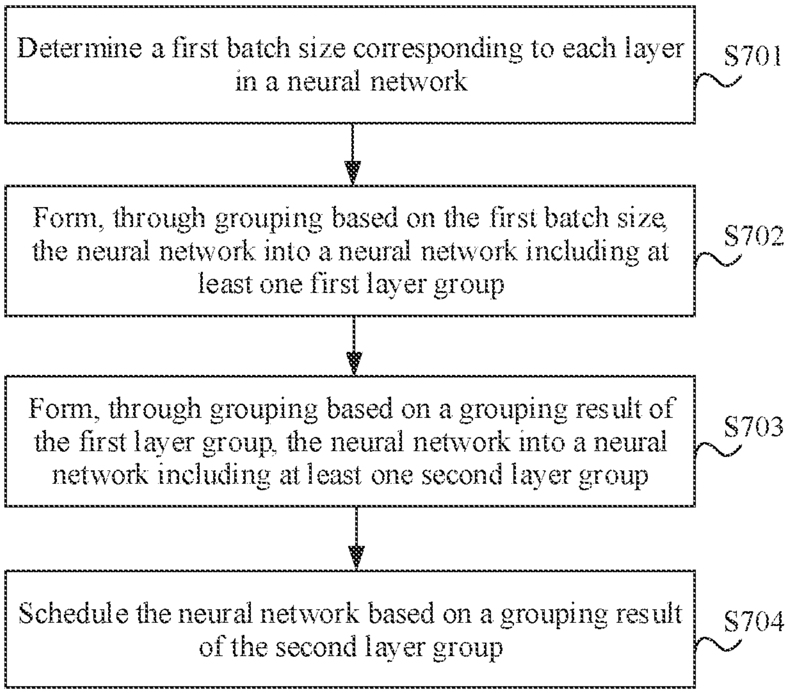
FIG. 7 is a first flowchart of a neural network scheduling method according to an embodiment of this application.

FIG. 7 is a schematic diagram of a neural network scheduling method according to an embodiment of this application. As shown in FIG. 7, the method includes S701 to S704.

S701. Determine a first batch size corresponding to each layer in a neural network.

An input layer in the neural network receives input data for processing. In a processing process, the neural network needs to be scheduled. The input data is data in a data set. Image processing is used as an example for description. For example, the input data is 32 pictures in a data set.

Specifically, the first batch size corresponding to each layer in the neural network is determined for a buffer requirement of each layer in the neural network and a capacity of an on-chip memory.

In a process in which the layer in the neural network processes data, as shown in FIG. 6, a data transfer-in process and a data transfer-out process simultaneously exist in some time periods, that is, the buffer requirement corresponding to each layer includes a buffer requirement of one or more pieces of input data and a buffer requirement of one or more pieces of output data. A data division size, namely, a batch size, corresponding to a layer may be determined based on a buffer requirement of the layer and the capacity of the on-chip memory.

Optionally, based on a feature such as a high scheduling speed of the on-chip memory, first, for each layer in the neural network, all input data and all output data of the layer are stored in the on-chip memory, to reduce data transfer time overheads. When layer grouping is not considered, that is, when an overlap problem and a gather/scatter problem are not considered, a maximum batch size corresponding to each layer in the neural network is determined based on one or more pieces of input data and one or more pieces of output data of each layer in the neural network and the capacity of the on-chip memory. If a buffer requirement generated when a layer in the neural network processes data corresponding to a maximum batch size is less than or equal to the capacity of the on-chip memory, the maximum batch size is used as a maximum amount of data that can be processed by the current layer, and is used as a base batch size in a subsequent batch size adjustment process.

For example, it is assumed that the capacity of the on-chip memory is 100. If a corresponding buffer requirement existing when L0 processes one picture is 105, it is determined that a base batch size of L0 is a half picture. If a corresponding buffer requirement existing when L1 processes one picture is 50, it is determined that a base batch size of L1 is two pictures.

Figure 8:
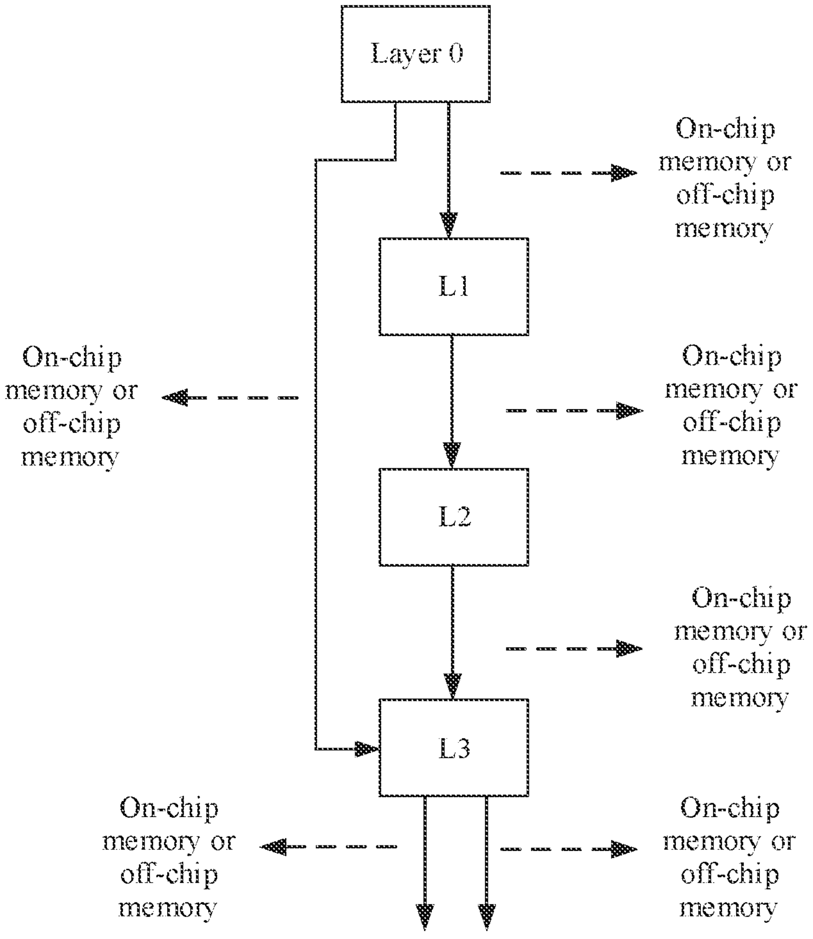
FIG. 8 is a schematic diagram of a data storage location of a neural network according to an embodiment of this application.

Then, after a data storage location is adjusted based on the base batch size, the first batch size is obtained. For example, as shown in FIG. 8, each piece of input data and each piece of output data corresponding to each layer in the neural network may be selectively stored in the on-chip memory or an off-chip memory. Therefore, data corresponding to some layers, in the neural network, whose base batch sizes are small due to a large buffer requirement may be stored in the off-chip memory, that is, at least one piece of input data or at least one piece of output data of at least one layer in the neural network is stored in the off-chip memory. After the storage location is adjusted, a base batch size corresponding to the at least one layer may be increased, to ensure that more data can be processed one time, so as to reduce a proportion of head overheads and tail overheads, and reduce a quantity of times of interaction with storage space.

Based on operation overheads of the neural network, in a process of adjusting the storage locations of the one or more pieces of input data and/or the one or more pieces of output data of the at least one layer in the neural network and the base batch size of the at least one layer, storage locations that are of one or more pieces of input data and one or more pieces of output data of each layer in the neural network and that exist when the operation overheads are the lowest are obtained, and the first batch size corresponding to the layer in the current neural network is determined, to resolve a problem in a conventional technology that maximum batch sizes corresponding to some layers with a large buffer requirement in the neural network are small due to a small capacity of the on-chip memory. If the maximum batch size is small, a proportion of head overheads and tail overheads in one time of data processing is large, and a proportion of actual calculation overheads is small. In addition, if the maximum batch size is small, these layers need to perform calculation a plurality of times to complete processing of a current data set. Consequently, a quantity of times of interaction increases, and actual total overheads of the neural network are lame.

For example, a buffer requirement of a layer in the neural network is large. Due to a limitation of the capacity of the on-chip memory, a maximum batch size corresponding to the layer is one tenth of a picture, and the maximum batch size is used as a base batch size of the layer. In this case, a quantity of pictures in the data set is 32. If the data set is processed by using the current base batch size, a quantity of times of interaction is large, and operation overheads of the neural network are high. Therefore, a storage location of at least one piece of input data or at least one piece of output data corresponding to the layer is adjusted, to increase the batch size and reduce the operation overheads. For example, after a storage location of some data is adjusted based on the operation overheads, it is determined that a first batch size of the layer is two pictures.

In this way, storage locations of input data and output data of each layer in the neural network and the first batch size corresponding to each layer are determined based on the capacity of the on-chip memory and the operation overheads of the neural network. Some data in the neural network is stored in the off-chip memory through adjustment instead of storing all input data and/or output data in the on-chip memory or the off-chip memory. The first batch size is optimized from the perspective of overall performance of the neural network. Therefore, when it is ensured that utilization of the on-chip memory is improved, a quantity of times of data interaction of a layer with a large buffer requirement in an operation process is reduced, and operation performance of the neural network is improved.

S702. Form, through grouping based on the first batch size, the neural network into a neural network including at least one first layer group.

Each first layer group includes at least one layer in the neural network, first batch size corresponding to layers in each first layer group are the same, and a buffer requirement of each first layer group is less than or equal to the capacity of the on-chip memory.

Optionally, a grouping, manner in which the neural network is formed, through grouping, into a neural network including the first layer group is determined from the first layer in the neural network based on the first batch size and the capacity of the on-chip memory. For example, if it is determined that a batch size corresponding to L2 is the same as a first batch size corresponding to L1, it is further determined whether a buffer requirement existing when L1 and L2 are grouped into a whole for scheduling exceeds the capacity of the on-chip memory. If the buffer requirement does not exceed the capacity of the on-chip memory, L1 and L2 are grouped into a first layer group. Then, it is determined whether a batch size corresponding to L3 is the same as the first batch sizes corresponding to L1 and L2. If the first batch size corresponding to L3 is the same as the first batch sizes corresponding to L1 and L2, it continues to be determined whether a buffer requirement existing when L1, L2, and L3 are grouped into a whole for scheduling exceeds the capacity of the on-chip memory. If the first batch size corresponding to L3 is different from the first batch sizes corresponding to L1 and L2, L1 and L2 are grouped into a first layer group, and grouping continues to be performed from L3, to obtain a next first layer group. If the buffer requirement existing when L1 and L2 are grouped into a whole for scheduling exceeds the capacity of the on-chip memory, L1 is grouped into a first layer group, and grouping continues to be performed from L2, to obtain a next first layer group. In this way, the foregoing steps are cyclically performed, and after all the layers included in the neural network are traversed, the neural network is formed, through grouping, into a neural network including at least one first layer group.

Optionally, first, consecutive layers with a same first batch size in the neural network are determined, and these layers are separately used as grouping units, to perform the grouping step. Then, a layer group is obtained through grouping from the first layer in the grouping unit based on a sequence of scheduling layers in the neural network. For example, it is assumed that the neural network includes 10 layers, first batch sizes corresponding to L0 to L3 are the same, L4 separately corresponds to a first batch size, and first batch sizes corresponding to L5 to L9 are the same. In this case, it is determined, based on the first batch size, that the neural network includes three grouping units: L0 to L3, L4, and L5 to L9. Then, the grouping unit L0 to L3 is selected based on a sequence of scheduling layers in the neural network, and grouping is performed on the current grouping unit (L0 to L3) from L0. For a specific grouping step, refer to the foregoing descriptions. Details are not described herein again. After the layers in L0 to L3 are grouped into a first layer group, grouping continues to be performed on a next grouping unit, namely, the grouping unit corresponding to L4, based on the sequence of scheduling the layers in the neural network. Because the grouping unit includes only one layer, L4 is directly grouped into a first layer group including one layer. Then, grouping starts to be performed on the grouping unit including L5 to L9. After all the grouping units are sequentially traversed, the neural network is formed, through grouping, into a neural network including at least one first layer group. Certainly, all the grouping units may be processed in another sequence, to form, through grouping, the neural network into a neural network including at least one first layer group.

Figure 9:
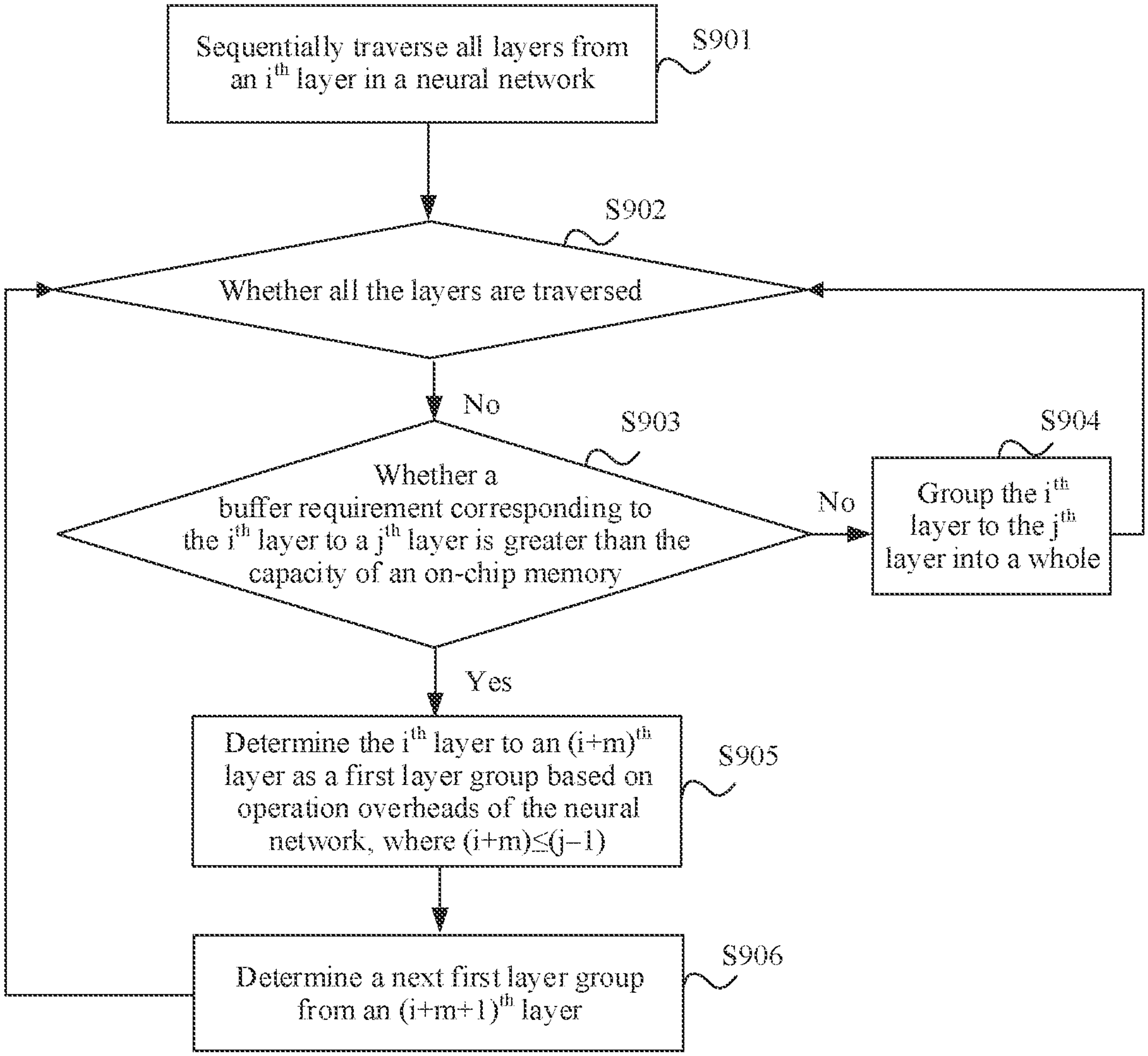
FIG. 9 is a second flowchart of a neural network scheduling method according to an embodiment of this application.

As shown in FIG. 9, step S702 may be specifically implemented as step S901 to step S906.

S901. Sequentially traverse all layers from an $i^{th}$ layer in the neural network.

S902. Determine whether all the layers are traversed; and if all the layers are not traversed, perform step S903; or if all the layers are traversed, complete a process of forming, through grouping, the entire neural network into a neural network including at least one first layer group.

S903. Determine whether a buffer requirement corresponding to the $i^{th}$ layer to a $j^{th}$ layer is greater than the capacity of the on-chip memory, to determine a first layer group in current grouping; and if the buffer requirement corresponding to the $i^{th}$ layer to the $j^{th}$ layer is not greater than the capacity of the on-chip memory, perform step S904; or if the buffer requirement corresponding to the $i^{th}$ layer to the $j^{th}$ layer is greater than the capacity of the on-chip memory, perform step S905.

First batch sizes of the layer to the $i^{th}$ layer to the $j^{th}$ layer in the neural network are the same, and i and j are positive integers.

Optionally, the foregoing step S901 to step S903 are specifically implemented as follows: The neural network is divided from the first layer in the neural network, that is, the neural network is divided from i=1. All the layers in the neural network are sequentially traversed, and consecutive layers with a same first batch size are grouped into a whole. In a grouping process, it is determined whether a corresponding buffer requirement is greater than the capacity of the on-chip memory. Consecutive layers are adjacent layers, and operation operations of these layers may be the same or different. Because the neural network processes data by using an operator of a layer, input data of each layer is output data of a previous layer, and a current layer needs to perform an operation based on output data obtained by a previous layer by performing an operation. In other words, data transmission at the layer in the neural network is data-dependent. Therefore, a layer group can be obtained only by grouping adjacent layers, and a sequence of subsequently scheduling these layers is consistent with a sequence of scheduling these layers in the neural network.

For example, as shown in FIG. 4, it is assumed that first batch sizes of the first four layers (namely, L0 to L3) in the neural network are all one quarter of a picture, sizes of convolution kernels of L0 to L3 are 3*3, and a stride by which the convolution kernel moves is 1. In this case, due to an overlap problem, each time a layer is added to a current grouping whole, input data of a layer previous to the layer in the whole needs to be padded with two rows of data. Currently, grouping starts from the first layer L0 in the neural network. When L0 and L1 are grouped into a whole, two rows of data need to be added to input data of L0, to determine whether a current buffer requirement exceeds the capacity of the on-chip memory, that is, determine whether a buffer requirement existing after padding data is added to L0 exceeds the capacity of the on-chip memory. If the buffer requirement does not exceed the capacity of the on-chip memory, step S904 is performed. If the buffer requirement exceeds the capacity of the on-chip memory, step S905 is performed.

S904. Group the $i^{th}$ layer to the $j^{th}$ layer into a whole.

Optionally, after the $j^{th}$ layer is grouped into a grouping whole corresponding to current grouping, namely, a whole including a $(j-1)^{th}$ layer, if a buffer requirement existing when the $i^{th}$ layer to the $j^{th}$ layer are scheduled as a whole does not exceed the capacity of the on-chip memory, step S902 to step S904 are cyclically performed to continue the current grouping process until the buffer requirement exceeds the capacity of the on-chip memory. In this case, step S905 is performed to determine a first layer group in current grouping. In other words, a $(j+1)^{th}$ layer continues to be grouped into a current grouping whole, to continue to determine whether a buffer requirement existing when the $i^{th}$ layer to the $(j+1)^{th}$ layer are scheduled as a whole is greater than the capacity of the on-chip memory.

For example, as shown in FIG. 4, in the example of step S903, it is assumed that L0 and L1 are grouped into a whole. Then, after L2 is grouped into a whole (namely, a whole obtained by grouping L0 and L1) corresponding to current grouping, if a buffer requirement does not exceed the capacity of the on-chip memory, L0 to L2 are temporarily grouped into a whole, that is, L0 to L2 are grouped into a whole in current grouping, and then step S902 is performed again to determine whether all the layers are traversed. In the neural network shown in FIG. 4, L3 is not traversed. In this case, step S903 is performed to continue to group L3 to a grouping whole corresponding to current grouping, to determine whether a buffer requirement exceeds the capacity of the on-chip memory.

S905. Determine the $i^{th}$ layer to an $(i+m)^{th}$ layer as a first layer group based on the operation overheads of the neural network, where $(i+m) \le (j-1)$.

Optionally, if a buffer requirement existing when the $i^{th}$ layer to the $j^{th}$ layer in the neural network are scheduled as a whole is greater than the capacity of the on-chip memory, and a buffer requirement existing when the $i^{th}$ layer to a $(j-1)^{th}$ layer are scheduled as a whole is less than or equal to the capacity of the on-chip memory, the $i^{th}$ layer to the $(i+m)^{th}$ layer are determined as a first layer group based on the operation overheads of the neural network, where m is a positive integer, and $(i+m) \le (j-1)$.

Specifically, a plurality of corresponding operation overheads existing when the $i^{th}$ layer to a $t^{th}$ layer are scheduled as a whole are obtained, where the $t^{th}$ layer is any one of an $(i+1)^{th}$ layer to the $(j-1)^{th}$ layer, t is a positive integer, and $(i+1) \le t \le (j-1)$. When the $i^{th}$ layer to the $(i+m)^{th}$ layer are scheduled as a whole, the operation overheads of the neural network are the lowest.

For example, as shown in FIG. 4, in the example of step S904, L0 to L2 have been grouped into a whole for scheduling, and the buffer requirement is less than or equal to the capacity of the on-chip memory. It is assumed that after L3 is grouped into the whole obtained by grouping L0 to L2, that is, after L0 to L3 are grouped into a whole, because a padding algorithm is used to perform an operation, a current buffer requirement is greater than the capacity of the on-chip memory. Therefore, L3 cannot be grouped into the whole obtained by grouping L0 to L2, to prevent a data amount in an operation process from exceeding the capacity of the on-chip memory. In addition, grouping manners of L0 to L2 are adjusted based on the operation overheads of the neural network. In an adjustment process, the operation overheads of the neural network are reduced. For example, t=1, t=2, and two corresponding. operation overheads are obtained. If operation overheads of the neural network that exist when L0 and L1 are determined as a first layer group are less than operation overheads of the neural network that exist when L0 to L2 are determined as a first layer group, L0 and L1 are determined as a first layer group, that is, m=1, the first layer and the second layer in the neural network are determined as a first layer group.

S906. Determine a next first layer group from an $(i+m+1)^{th}$ layer.

For example, as shown in FIG. 4, in the example of step S905, after L0 and L1 are determined as a first layer group, grouping continues to be performed from L2 to determine a next first layer group until all the layers in the neural network are traversed. In this case, grouping to obtain a first layer group is stopped. In other words, after step S906 is performed, step S902 is performed again to determine whether all the layers are traversed. Traversing all the layers includes cyclically traversing some layers. For example, in the example of step S904, L2 and L3 have been traversed. In the example of step S905, in the neural network shown in FIG. 4, after L0 and L1 are determined as a first layer group, it is necessary to continue grouping from L2 to determine a next first layer group, that is, L2 and L3 are repeatedly traversed.

S703. Form, through grouping based on a grouping result of the first layer group, the neural network into a neural network including at least one second layer group.

Each second layer group includes one or more first layer groups in the neural network, a buffer requirement of each second layer group is less than or equal to the capacity of the on-chip memory, and at least one second layer group includes at least two first layer groups with different first batch sizes.

Optionally, first layer groups that are adjacent to each other and whose first batch sizes are in a multiple relationship may be grouped into a second layer group. For example, it is assumed that a first batch size corresponding to the initial first layer group is two pictures, a first batch size corresponding to the second first layer group is eight pictures, the second first layer group is adjacent to the initial first layer group, and the first batch size thereof is three times the first batch size corresponding to the initial first layer group. In this case, if a buffer requirement existing when the initial first layer group and the second first layer group are used as a whole is less than or equal to the capacity of the on-chip memory, the two first layer groups may be grouped into a second layer group.

Optionally, first layer groups included in the neural network are sequentially traversed from the initial first layer group included in the neural network, to form, through grouping, the neural network into a neural network including at least one second layer group. For example, after the initial first layer group and the second first layer group are grouped into a whole, it is determined whether a buffer requirement of a current grouping whole exceeds the capacity of the on-chip memory. If the buffer requirement of the whole obtained by grouping the initial first layer group and the second first layer group exceeds the capacity of the on-chip memory, the initial first layer group is grouped into a second layer group, and grouping continues to be performed from the second first layer group, to obtain a next second layer group. If the initial first layer group and the second first layer group are grouped into a whole and a buffer requirement of a current grouping whole does not exceed the capacity of the on-chip memory, the initial first layer group and the second first layer group are grouped into a second layer group. Then, it is determined whether a buffer requirement of a current grouping whole existing after the third first layer group is grouped into the whole including the initial first layer group and the second first layer group exceeds the capacity of the on-chip memory. In this way, the foregoing steps are cyclically performed, and after all the first layer groups included in the neural network are traversed, the neural network is formed, through grouping, into a neural network including at least one second layer group.

Figure 10:
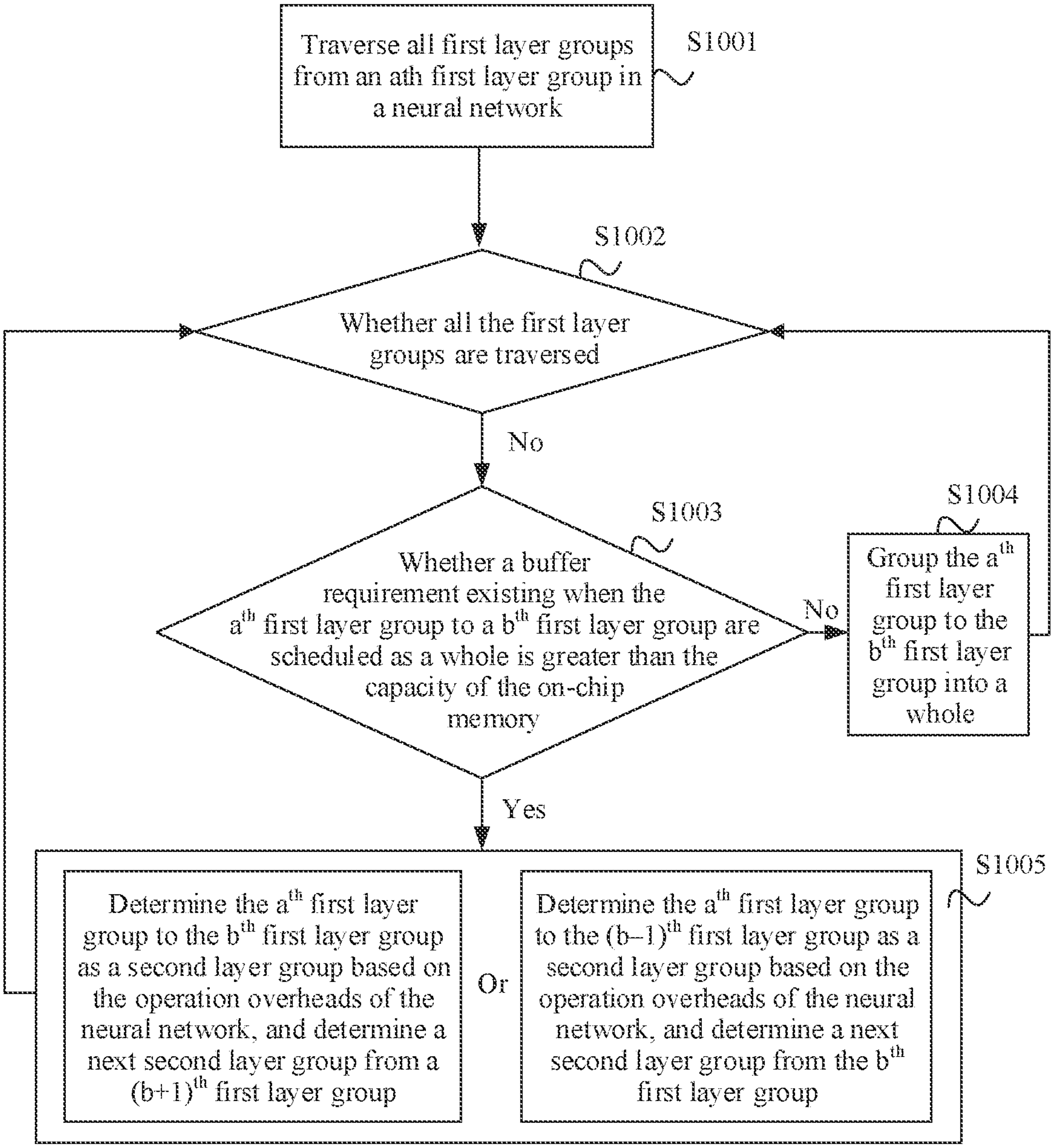
FIG. 10 is a third flowchart of a neural network scheduling method according to an embodiment of this application.

As shown in FIG. 10, step S703 may be specifically implemented as step S1001 to step S1005.

S1001. Traverse all first layer groups from an $a^{th}$ first layer group in the neural network.

S1002. Determine whether all the first layer groups are traversed; and if all the first layer groups are not traversed, perform step S1003; or if all the first layer groups are traversed, complete a process of forming, through grouping, the entire neural network into a neural network including at least one second layer group.

S1003. Determine whether a buffer requirement existing when the $a^{th}$ first layer group to a $b^{th}$ first layer group are scheduled as a whole is greater than the capacity of the on-chip memory, to determine a second layer group in current grouping; and if the buffer requirement existing when the $a^{th}$ first layer group to the $b^{th}$ first layer group are scheduled as a whole is not greater than the capacity of the on-chip memory, perform step S1004; or if the buffer requirement existing when the $a^{th}$ first layer group to the $b^{th}$ first layer group are scheduled as a whole is greater than the capacity of the on-chip memory, perform step S1005.

The $a^{th}$ first layer group to the $b^{th}$ first layer group in the neural network are consecutive first layer groups, at least two first layer groups corresponding to different first batch sizes exist in the $a^{th}$ first layer group to the $b^{th}$ first layer group, and a and b are positive integers. Because data processing at the layer in the neural network is interlayer data-dependent, the second layer group can be obtained only by grouping adjacent first layer groups.

Optionally, the foregoing step S1001 to step S1003 are specifically implemented as follows: The neural network is divided from the initial first layer group in the neural network, that is, the neural network is divided from a=1. All the first layer groups in the neural network are sequentially traversed, and a second layer group is obtained through grouping, and a buffer requirement corresponding to the second layer group is less than or equal to the capacity of the on-chip memory. Based on data dependency of data transmission at the layer in the neural network, first layer groups grouped into a second layer group are consecutive first layer groups.

For example, as shown in FIG. 5, it is assumed that L0 and L1 in the neural network form the initial first layer group, and a corresponding first batch size is two pictures. L2 and L3 form the second first layer group, and a corresponding first batch size is four pictures. L4 and L5 form the third first layer group, and a corresponding first batch size is two pictures. The three first layer groups are consecutive first layer groups, and grouping starts from the initial first layer group, to obtain a second layer group. If the initial first layer group and the second first layer group are grouped into a whole, in a process of scheduling the neural network to perform an operation, L0 and L1 generate an additional buffer requirement for the on-chip memory due to a gather problem. If the second first layer group and the third first layer group are grouped into a whole, in a process of scheduling the neural network to perform an operation, L4 and L5 generate an additional buffer requirement for the on-chip memory due to a scatter problem. Whether the buffer requirement of the second layer group exceeds the capacity of the on-chip memory after the additional buffer requirement for the on-chip memory is added needs to be determined. If the buffer requirement does not exceed the capacity of the on-chip memory, step S1004 is performed. If the buffer requirement exceeds the capacity of the on-chip memory, step S1005 is performed.

S1004. Group the $a^{th}$ first layer group to the $b^{th}$ first layer group into a whole.

Optionally, after the $b^{th}$ first layer group is grouped into a grouping whole corresponding to current grouping, namely, a second layer group including a $(b-1)^{th}$ first layer group, if a buffer requirement existing when the $a^{th}$ first layer group to the $b^{th}$ first layer group are scheduled as a whole does not exceed the capacity of the on-chip memory, step S1002 to step S1004 are cyclically performed to continue to perform current grouping to obtain the second layer group until the buffer requirement exceeds the capacity of the on-chip memory. In this case, step S1005 is performed to determine the second layer group in current grouping, and start to determine a next second layer group. In other words, a $(b+1)^{th}$ first layer group continues to be grouped into a current grouping whole including the $a^{th}$ first layer group to the $b^{th}$ first layer group, to continue to determine whether a buffer requirement is greater than the capacity of the on-chip memory.

For example, as shown in FIG. 5, based on the example of step S1003, after the initial first layer group (L0 and L1) and the second first layer group (L2 and L3) are grouped into a whole, if a buffer requirement of a current grouping whole does not exceed the capacity of the on-chip memory, after L0 to L3 are grouped into a whole, current grouping continues to be performed to obtain the second layer group, that is, step S1002 is performed again to determine whether all the first layer groups are traversed. In the neural network shown in FIG. 5, the third first layer group (L4 and L5) is not traversed, and the third first layer group continues to be grouped into a whole that is obtained by grouping L0 to L3 and that corresponds to current grouping, to determine whether a buffer requirement of a current grouping whole exceeds the capacity of the on-chip memory.

S1005. Determine the $a^{th}$ first layer group to the $b^{th}$ first layer group as a second layer group based on the operation overheads of the neural network, and determine a next second layer group from a $(b+1)^{th}$ if first layer group; or determine the $a^{th}$ first layer group to the $(b-1)^{th}$ first layer group as a second layer group based on the operation overheads of the neural network, and determine a next second layer group from the $b^{th}$ first layer group.

Optionally, if a buffer requirement existing when the $a^{th}$ first layer group to the $b^{th}$ first layer group in the neural network are scheduled as a whole is greater than the capacity of the on-chip memory, and a buffer requirement existing when the $a^{th}$ first layer group to the $(b-1)^{th}$ first layer group are scheduled as a whole is less than or equal to the capacity of the on-chip memory, the $a^{th}$ first layer group to the $b^{th}$ first layer group are determined as a second layer group based on the operation overheads of the neural network, or the $a^{th}$ first layer group to the $(b-1)^{th}$ first layer group are determined as a second layer group based on the operation overheads of the neural network. If the $a^{th}$ first layer group to the $b^{th}$ first layer group are determined as a second layer group, a first batch size corresponding to the $b^{th}$ first layer group or the $(b-1)^{th}$ first layer group is reduced.

Specifically, when the $a^{th}$ first layer group to the $b^{th}$ first layer group are scheduled as a whole, the operation overheads of the neural network are first operation overheads. When the $a^{th}$ first layer group to the $(b-1)^{th}$ first layer group are scheduled as a whole, the operation overheads of the neural network are second operation overheads. If the first operation overheads are less than the second operation overheads, the $a^{th}$ first layer group to the $b^{th}$ first layer group are determined as a second layer group. If the second overheads are less than the first operation overheads, the $a^{th}$ first layer group to the $(b-1)^{th}$ first layer group are determined as a second layer group.

For example, as shown in FIG. 5, in the example of step S1004, the initial first layer group (L0 and L1) and the second first layer group (L2 and L3) have been grouped into a second layer group, and the buffer requirement is less than or equal to the capacity of the on-chip memory. It is assumed that the third first layer group (L4 and L5) is grouped into the second layer group obtained by grouping L0 to L3. L4 and L5 generate an additional buffer requirement for the on-chip memory due to a scatter problem. Consequently, a buffer requirement of a current grouping whole is greater than the capacity of the on-chip memory. In this case, after the initial first layer group and the second first layer group are grouped into a second layer group, all the first layer groups continue to be traversed from the third first layer group, to obtain the second layer group through grouping, that is, the third first layer group is not grouped into the current second layer group.

For another example, it is assumed that a first batch size corresponding to the initial first layer group is two pictures, and a first batch size corresponding to the second first layer group is six pictures. If the two first layer groups are grouped into a whole, the initial first layer group is scheduled to perform an operation three times, and the second first layer group needs to be scheduled to perform an operation only one time. Due to a gather problem, a layer in the initial first layer group generates an additional buffer requirement for the on-chip memory. Consequently, a buffer requirement of a second layer group is greater than the capacity of the on-chip memory. In this case, the first batch size corresponding to the second first layer group may be reduced, for example, the size is reduced to four pictures. In this case, the additional buffer requirement of the layer in the initial first layer group for the on-chip memory is correspondingly lowered, the two first layer groups may be grouped into a second layer group, and the buffer requirement of the second layer group is less than or equal to the capacity of the on-chip memory.

Then, a next second layer group starts to be determined, and step S1002 is performed again to determine whether all the first layer groups are traversed.

Optionally, traversing all the first layer groups includes cyclically traversing some first layer groups. For example, in the foregoing step S1005, after the $a^{th}$ first layer group to the $(b-1)^{th}$ first layer group as a second layer group is determined, a next second layer group is determined from the $(b-1)^{th}$ first layer group, that is, the $b^{th}$ first layer group is repeatedly traversed.

The foregoing step S1001 to step S1005 are performed until all the first layer groups in the neural network are traversed. In this case, grouping to obtain a second layer group in the neural network is stopped. The neural network is formed, through grouping, into a neural network including at least one second layer group. At least one piece of input data or at least one piece of output data of the layer included in the second layer group is stored in the on-chip memory, and input data of the first layer and output data of the last layer in the second layer group are stored in the off-chip memory.

S704. Process input data of the neural network based on a grouping result of the second layer group.

Optionally, the input data of the neural network is input data of the first second layer group, output data of the second layer group is input data of a next second layer group, and output data of the last second layer group is output data of the neural network. In a process of processing the input data of the neural network based on the grouping result of the second layer group, a sequence of scheduling layers in the second layer group is determined based on a sequence of scheduling first layer groups included in the second layer group and a sequence of scheduling layers in the first layer group.

The sequence of scheduling the layers in the first layer group is the same as a sequence of scheduling layers in the neural network existing before grouping, and the sequence of scheduling the first layer groups included in the second layer group is determined based on the first batch size and a sequence of scheduling the first layer and the last layer in the first layer group.

Figure 11:
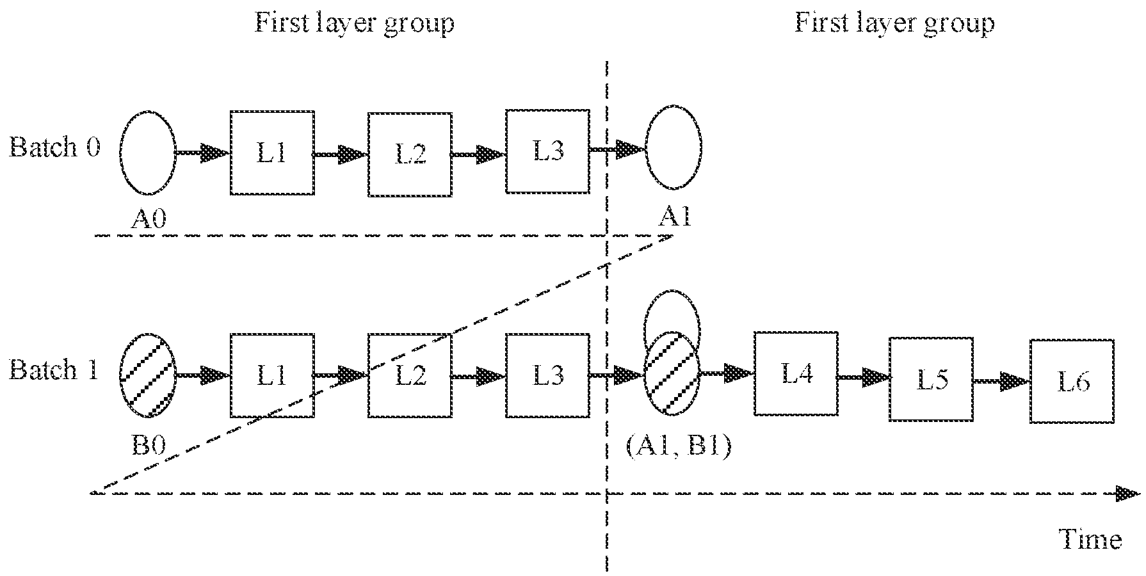
FIG. 11 is a second schematic diagram of a neural network scheduling scenario according to an embodiment of this application.

For example, as shown in FIG. 11, the neural network includes six convolutional layers L1 to L6, and a scheduling sequence existing before grouping is L1→L2→L3→L4→L5→L6. L1 to L3 form a first layer group, and a corresponding first batch size is two pictures. L4 to L6 form a first layer group, and a corresponding first batch size is four pictures. The two first layer groups are two consecutive first layer groups, and the corresponding first batch sizes are in a multiple relationship. After the two first layer groups are grouped into a second layer group, a buffer requirement of the second layer group is less than or equal to the capacity of the on-chip memory. In this case, input data of the neural network is processed based on a grouping result of the second layer group. The input data is input into L1. As shown in FIG. 11, the input data is A0 and B0, and corresponding first batch sizes are respectively two pictures. A scheduling sequence of the initial first layer group (L1 to L3) is L1→L2→L3, and a scheduling sequence of the second first layer group (L4 to L6) is L4→L5→L6. It is determined, based on the first batch size, that the initial first layer group needs to be scheduled two times, the second first layer group needs to be correspondingly scheduled only one time, and L3 in the neural network existing before grouping is scheduled before L4. In this case, as shown in FIG. 11, a sequence of scheduling the layers in the neural network existing after grouping is L1→L2→L3→L1→L2→L3→L4→L5→L6.

It may be learned that in the neural network scheduling method in this embodiment of this application, a batch size of each layer in the neural network is first determined based on the capacity of the on-chip memory, and then layers with a same batch size are fused into a first layer group. Subsequently, a plurality of first layer groups are fused into a second layer group based on a buffer requirement of the first layer group and the capacity of the on-chip memory. In this way, the obtained second layer group includes first layer groups with different batch sizes. In other words, when the neural network is subsequently scheduled based on the second layer group, the input data is processed based on different batch sizes. In this case, a buffer requirement of each second layer group does not exceed the capacity of the on-chip memory, utilization of the on-chip memory can be improved, and running performance of hardware can be improved.

The following describes, by using a specific example, the neural network scheduling method provided in this embodiment of this application.

Example 1: Input Data is Complete-Picture Data

Figure 12:
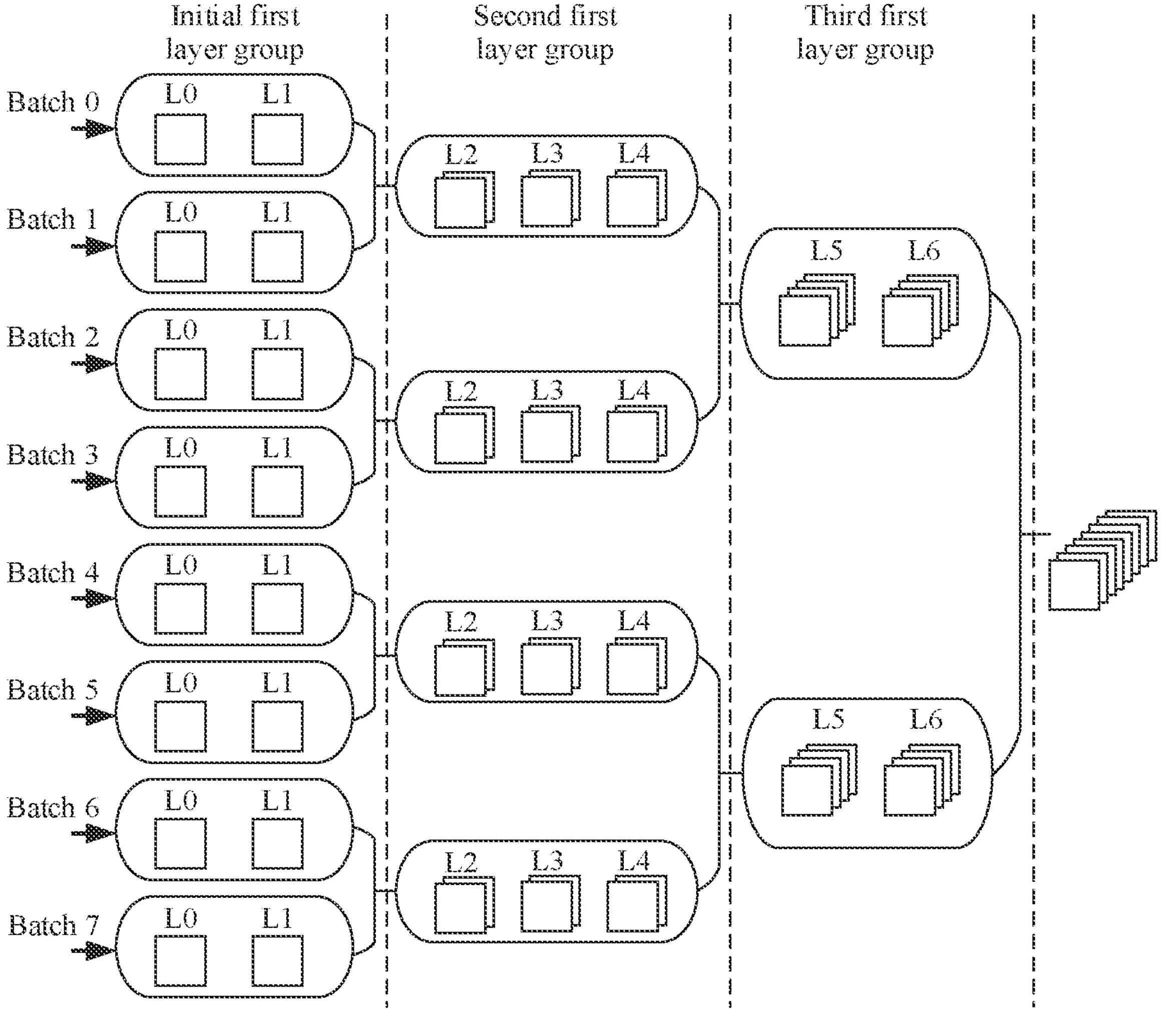
FIG. 12 is a third schematic diagram of a neural network scheduling scenario according to an embodiment of this application.

As shown in FIG. 12, based on the capacity of the on-chip memory, from the perspective of overall performance of the neural network, it is determined that batch sizes corresponding to L0 and L1 are one picture, batch sizes corresponding to L2, L3, and L4 are two pictures, and batch sizes corresponding to L5 and L6 are four pictures. In the neural network scheduling method provided in this embodiment of this application, L0 and L1 are grouped into the initial first layer group, L2 to L4 are grouped into the second first layer group, and L5 and L6 are grouped into the third first layer group. For the gather problem, based on the capacity of the on-chip memory, from the perspective of overall performance of the neural network, the three first layer groups are grouped into a second layer group, that is, L0 to L6 are grouped into a second layer group, and a buffer requirement of the second layer group is less than or equal to the capacity of the on-chip memory. The second layer group includes layers with different batch sizes. In a process of scheduling a layer group in the neural network to process input data, utilization of the on-chip memory can be improved, and running performance of hardware can be improved.

As shown in FIG. 12, it is assumed that a data set includes eight pictures, L0 is the first layer in the second layer group, and a batch size thereof is one picture. Therefore, the data set is divided into eight batches of input data (a batch 0 to a batch 7 shown in FIG. 12), each batch of input data is complete-picture data corresponding to one picture, and the data is input to L0 in batches. As shown in FIG. 12, in a process of processing the input data in the current data set, the initial first layer group is scheduled two times, and the second first layer group is correspondingly scheduled one time, that is, a scheduling sequence is L0→L1→L0→L1→L2→L3→L4 . The second first layer group is scheduled two times, and the third first layer group is correspondingly scheduled one time, that is, a scheduling sequence is L2→L3→L4→L2→L3→L4→L5→L6. If the input data in the current data set is processed, the initial first layer group needs to be scheduled eight times, the second first layer group needs to be scheduled four times, and the third first layer group needs to be scheduled two times.

Example 2: Input Data is Non-Complete-Picture Data

Figure 13:
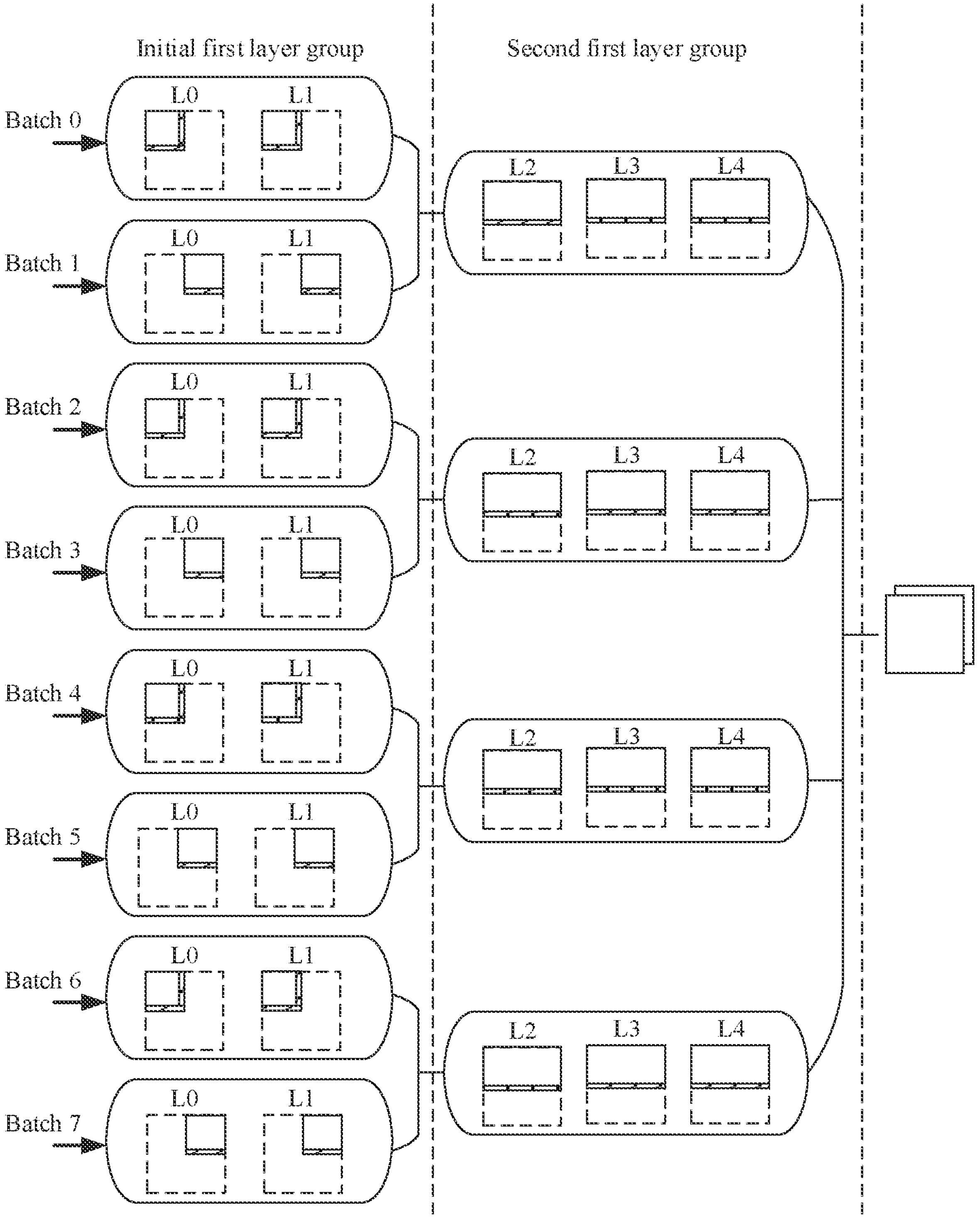
FIG. 13 is a fourth schematic diagram of a neural network scheduling scenario according to an embodiment of this application.

As shown in FIG. 13, based on the capacity of the on-chip memory, from the perspective of overall performance the neural network, it is determined that batch sizes corresponding to L0 and L1 are one quarter of a picture, and batch sizes corresponding to L2, L3, and L4 are a half picture. In the neural network scheduling method provided in this embodiment of this application, L0 and L1 are grouped into the initial first layer group, and L2 to L4 are grouped into the second first layer group. For the overlap problem, as shown in FIG. 13, the input data is non-complete-picture data, and the input data needs to be processed by using a padding algorithm, where padding data is a shadow part. Based on the capacity of the on-chip memory, from the perspective of overall performance of the neural network, the two first layer groups are grouped into a second layer group, that is, L0 to L4 are grouped into a second layer group, and a buffer requirement of the second layer group is less than or equal to the capacity of the on-chip memory. The second layer group includes layers with different batch sizes. In a process of scheduling a layer group in the neural network to process input data, utilization of the on-chip memory can be improved, and running performance of hardware can be improved.

As shown in FIG. 13, it is assumed that a data set includes two pictures, L0 is the first layer in the second layer group, and a batch size thereof is one quarter of a picture. Therefore, the data set is divided into eight batches of input data (a batch 0 to a batch 7 shown in FIG. 13), each batch of input data is non-complete-picture data corresponding to one quarter of a picture, and the data is input to L0 in batches. As shown in FIG. 13, in a process of processing the input data in the current data set, the initial first layer group is scheduled two times, and the second first layer group is correspondingly scheduled one time, that is, a scheduling sequence is L0→L1→L0→L1→L2→L3→L4. If the input data in the current data set is processed, the initial first layer group needs to be scheduled eight times, and the second first layer group needs to be scheduled four times.

Figure 14:
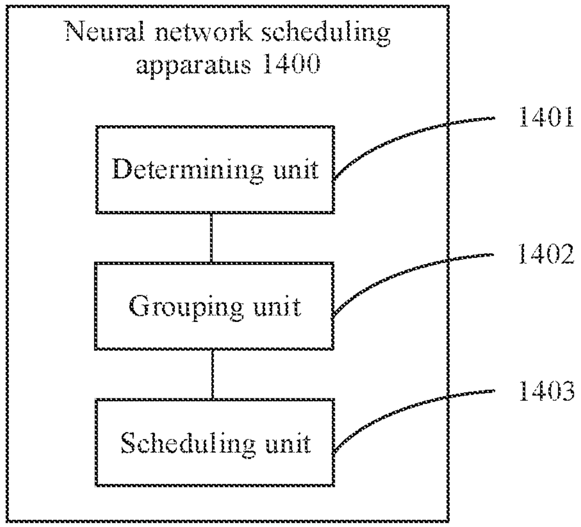
FIG. 14 is a first schematic diagram of a structure of a neural network scheduling apparatus according to an embodiment of this application.

With reference to FIG. 7, FIG. 9, and FIG. 10, the foregoing describes in detail the neural network scheduling method provided in the embodiments of this application. With reference to FIG. 14, the following describes in detail the neural network scheduling apparatus provided in the embodiments of this application.

In a possible design, FIG. 14 is a schematic diagram of a structure of a neural network scheduling apparatus according to an embodiment of this application. As shown in FIG 14, a neural network scheduling apparatus 1400 includes a determining unit 1401, a grouping unit 1402, and a scheduling unit 1403. The neural network scheduling apparatus 1400 may be configured to implement a function of a device in the foregoing method embodiments. The neural network scheduling apparatus 1400 may be the device, may be a functional unit or a chip in the device, or an apparatus used in conjunction with a communication device.

Optionally, the determining unit 1401 is configured to determine a first batch size corresponding to each layer in a neural network.

Optionally, the grouping unit 1402 is configured to form, through grouping based on the first batch size, the neural network into a neural network including at least one first layer group.

Each first layer group includes at least one layer in the neural network, first batch size corresponding to layers in each first layer group are the same, and a buffer requirement of each first layer group is less than or equal to a capacity of an on-chip memory.

Optionally, the grouping unit 1402 is further configured to form, through grouping based on a grouping result of the first layer group, the neural network into a neural network including at least one second layer group.

Each second layer group includes at least one first layer group, a buffer requirement of each second layer group is less than or equal to the capacity of the on-chip memory, and at least one second layer group includes at least two first layer groups with different first batch sizes.

Optionally, the scheduling unit 1403 is configured to schedule the neural network based on a grouping result of the second layer group.

In a possible implementation, the determining unit 1401 is specifically configured to determine, for a buffer requirement of each layer in the neural network and the capacity of the on-chip memory, the first batch size corresponding to each layer in the neural network.

In a possible implementation, the determining unit 1401 is specifically configured to determine, for one or more pieces of input data and one or more pieces of output data of each layer in the neural network and the capacity of the on-chip memory, the first batch size corresponding to each layer in the neural network.

At least one piece of input data or at least piece one of output data of at least one layer in the neural network is stored in an off-chip memory.

In a possible implementation, the determining unit 1401 is specifically configured to: adjust storage locations of one or more pieces of input data and/or one or more pieces of output data of at least one layer in the neural network based on operation overheads of the neural network, where the storage location includes the on-chip memory or the off-chip memory;

in a process of adjusting the storage location, obtain storage locations that are of one or more pieces of input data and one or more pieces of output data of each layer in the neural network and that exist when the operation overheads of the neural network are the lowest; and then, determine the first batch size corresponding to each layer in the neural network based on the storage locations of the one or more pieces of input data and the one or more pieces of output data of each layer in the neural network and the capacity of the on-chip memory.

In a possible implementation, the grouping unit 1402 is specifically configured to: if a buffer requirement existing when an $i^{th}$ layer to a $j^{th}$ layer in the neural network are scheduled as a whole is greater than the capacity of the on-chip memory, and a buffer requirement existing when the $i^{th}$ layer to a $(j-1)^{th}$ layer are scheduled as a whole is less than or equal to the capacity of the on-chip memory, determine the $i^{th}$ layer to an $(i+m)^{th}$ layer as a first layer group based on the operation overheads of the neural network, where first batch sizes of the $i^{th}$ layer to the $j^{th}$ layer in the neural network are the same, i, j, and m are positive integers, and $(i+m)\leq(j-1)$.

In a possible implementation, the grouping unit 1402 is specifically configured to: obtain a plurality of corresponding operation overheads existing when the $i^{th}$ layer to a $t^{th}$ layer are scheduled as a whole, where the $t^{th}$ layer is any one of an $(i+1)^{th}$ layer to the $(j-1)^{th}$ layer, t is a positive integer, and $(i+1)\leq t\leq(j-1)$; and when the $i^{th}$ layer to the $(i+m)^{th}$ layer are scheduled as a whole, enable the operation overheads of the neural network to be the lowest.

In a possible implementation, the grouping unit 1402 is specifically configured to: if a buffer requirement existing when an $a^{th}$ first layer group to a $b^{th}$ first layer group in the neural network are scheduled as a whole is greater than the capacity of the on-chip memory, and a buffer requirement existing when the $a^{th}$ first layer group to a $(b-1)^{th}$ first layer group are scheduled as a whole is less than or equal to the capacity of the on-chip memory, determine the $a^{th}$ first layer group to the $b^{th}$ first layer group as a second layer group based on the operation overheads of the neural network, or determine the $a^{th}$ first layer group to the $(b-1)^{th}$ first layer group as a second layer group based on the operation overheads of the neural network, where at least two first layer groups corresponding to different first batch sizes exist in the $a^{th}$ first layer group to the $b^{th}$ first layer group in the neural network, and a and b are positive integers.

In a possible implementation, the grouping unit 1402 is further configured to: if the $a^{th}$ first layer group to the $b^{th}$ first layer group are determined as a second layer group, reduce a first batch size corresponding to the $b^{th}$ first layer group or the $(b-1)^{th}$ first layer group.

In a possible implementation, the grouping unit 1402 is specifically configured to: when the $a^{th}$ first layer group to the $b^{th}$ first layer group are scheduled as a whole, enable the operation overheads of the neural network to be first operation overheads, or when the $a^{th}$ first layer group to the $(b-1)^{th}$ first layer group are scheduled as a whole, enable the operation overheads of the neural network to be second operation overheads; and if the first operation overheads are less than the second operation overheads, determine the $a^{th}$ first layer group to the $b^{th}$ first layer group as a second layer group; or if the second overheads are less than the first operation overheads, determine the $a^{th}$ first layer group to the $(b-1)^{th}$ first layer group as a second layer group.

In a possible implementation, in a process of scheduling the neural network based on the grouping result of the second layer group, a sequence of scheduling layers in the second layer group is determined based on a sequence of scheduling first layer groups included in the second layer group and a sequence of scheduling layers in the first layer group.

In a possible implementation, the sequence of scheduling the layers in the first layer group is the same as a sequence of scheduling layers in the neural network existing before grouping, and the sequence of scheduling the first layer groups included in the second layer group is determined based on the first batch size and a sequence of scheduling the first layer and the last layer in the first layer group.

In a possible implementation, at least one piece of input data or at least one piece of output data of the layer included in the second layer group is stored in the on-chip memory, and input data of the first layer and output data of the last layer in the second layer group are stored in the off-chip memory.

Optionally, the neural network scheduling apparatus 1400 shown in FIG. 14 may further include a receiving unit and a sending unit (not shown in FIG. 14). The receiving unit is configured to receive a signal sent by another communication apparatus. The sending unit is configured to send a signal to another communication apparatus.

Optionally, the neural network scheduling apparatus 1400 shown in FIG. 14 may further include a storage unit (not shown in FIG. 14), and the storage unit stores a program or instructions. When the determining unit 1401, the grouping unit 1402, and the scheduling unit 1403 execute the program or the instructions, the neural network scheduling apparatus 1400 shown in FIG. 14 may perform the neural network scheduling method shown in FIG. 7, FIG. 9, and FIG. 10.

For technical effects of the neural network scheduling apparatus 1400 shown in FIG. 14, refer to technical effects of the neural network scheduling method shown in FIG. 7, FIG. 9, and FIG. 10. Details are not described herein again.

The receiving unit and the sending unit may be collectively referred to as a transceiver unit that may be implemented by a transceiver or a transceiver-related circuit component, and may be a transceiver or a transceiver module. Operations and/or functions of the units in the neural network scheduling apparatus 1400 are separately intended to implement corresponding processes of the neural network scheduling method shown in FIG. 7, FIG. 9, and FIG. 10. For brevity, details are not described herein again.

Figure 15:
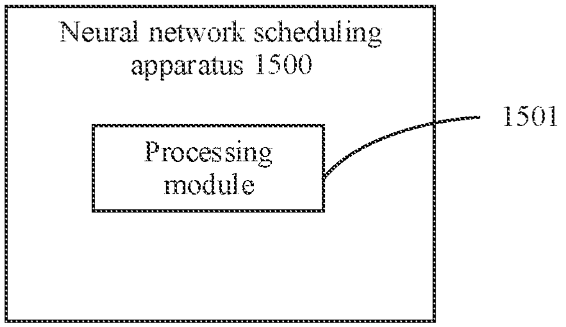
FIG. 15 is a second schematic diagram of a structure of a neural network scheduling apparatus according to an embodiment of this application.

When an integrated unit is used, FIG. 15 is another possible schematic composition diagram of the neural network scheduling apparatus in the foregoing embodiment. As shown in FIG. 15, a neural network scheduling apparatus 1500 may include a processing module 1501.

The processing module 1501 is configured to perform steps performed by the determining unit 1401, the grouping unit 1402, and the scheduling unit 1403 shown in FIG. 14. Operations and/or functions of the processing module 1501 are intended to implement corresponding processes of the neural network scheduling method shown in FIG. 7, FIG. 9, and FIG. 10. For brevity, details are not described herein again.

The neural network scheduling apparatus 1500 may further include a storage module, configured to store program code and data of the neural network scheduling apparatus. The storage module may be a memory.

The processing module 1501 may be a processor or a controller. The processing module 112 may implement or execute logical blocks, modules, and circuits in various examples described with reference to content disclosed in this application. Alternatively, the processor may be a combination for implementing a computing function, for example, a combination of one or more microprocessors, or a combination of the DSP and a microprocessor.

Figure 16:
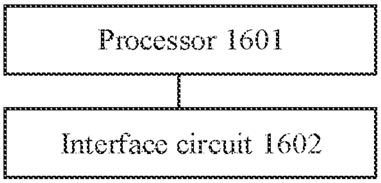
FIG. 16 is a schematic diagram of a structure of a chip system according to an embodiment of this application.

An embodiment of this application further provides a chip system. As shown in FIG. 16, the chip system includes at least one processor 1601 and at least one interface circuit 1602. The processor 1601 and the interface circuit 1602 may be interconnected by using a line. For example, the interface circuit 1602 may be configured to receive a signal from another apparatus. For another example, the interface circuit 1602 may be configured to send a signal to another apparatus (such as the processor 1601). For example, the interface circuit 1602 may read instructions stored in a memory, and send the instructions to the processor 1601. When the instructions are executed by the processor 1601, the neural network scheduling apparatus may perform steps in the neural network scheduling method in the foregoing embodiment. Certainly, the chip system may further include another discrete component. This is not specifically limited in this embodiment of this application.

An embodiment of this application further provides a chip system, including a processor, where the processor is coupled to a memory, the memory is configured to store a program or instructions, and when the program or the instructions is/are executed by the processor, the chip system is enabled to implement the method in any one of the foregoing method embodiments.

Optionally, there may be one or more processors in the chip system. The processor may be implemented by using hardware, or may be implemented by using software. When the processor is implemented by the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be separated from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

The processor 1301 may be a field-programmable gate array (field-programmable gate array, FPGA), an application specific integrated circuit (application specific integrated circuit, ASIC), a system on chip (system on chip, SoC), or a central processor unit (central processor unit, CPU), a network processor (network processor, NP), a digital signal processor (digital signal processor, DSP), a micro controller unit (micro controller unit, MCU), or a programmable logic device (programmable logic device, PLD) or another integrated chip may be used.

It should be understood that steps in the foregoing method embodiment may be completed by using an integrated logic circuit of hardware in the processor or an instruction in a form of software. The steps of the method disclosed with reference to embodiments of this application may be directly performed by a hardware processor, or may be performed by a combination of hardware and software modules in the processor.

An embodiment of this application further provides a storage medium, configured to store instructions used by the foregoing communication apparatus.

An embodiment of this application further provides a computer-readable storage medium. The computer-readable storage medium stores computer instructions. When the computer instructions are run on a server, the server is enabled to perform steps in the foregoing related method, to implement the neural network scheduling method in the foregoing embodiment.

An embodiment of this application further provides a computer program product. When the computer program product runs on a computer, the computer is enabled to perform the foregoing related steps, to implement the neural network scheduling method in the foregoing embodiment.

In addition, an embodiment of this application further provides an apparatus, where the apparatus may be specifically a component or a module, and the apparatus may include one or more connected processors and a memory. The memory is configured to store a computer program, and the one or more computer programs include instructions. When the instructions are executed by the one or more processors, the apparatus is enabled to perform the neural network scheduling method in the foregoing method embodiments.

The apparatus, the computer-readable storage medium, the computer program product, or the chip that is provided in the embodiments of this application is configured to perform the corresponding method provided above. Therefore, for beneficial effects that can be achieved, refer to the beneficial effects of the corresponding method provided above. Details are not described herein again.

Method or algorithm steps described in combination with the content disclosed in this application may be implemented by hardware, or may be implemented by a processor by executing software instructions. The software instruction may include a corresponding software module. The software module may be stored in a random access memory (random access memory, RAM), a flash memory, a read-only memory (read only memory, ROM), an erasable programmable read, only memory (erasable programmable ROM, EPROM), an electrically erasable programmable read only memory (electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an application-specific integrated circuit (application specific integrated circuit, ASIC).

Based on the foregoing descriptions of the implementations, a person skilled in the art may clearly understand that for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or a part of the functions described above. For a specific working process of the foregoing system, apparatus, and unit, refer to a corresponding process in the foregoing method embodiments, and details are not described herein again.

In the several embodiments provided in this application, it should be understood that the disclosed apparatuses and methods may be implemented in other mariners. For example, the described apparatus embodiments are merely examples. For example, division into the modules or units is merely logical function division, and may be other division during actual implementation. For example, a plurality of units or components may be combined or may be integrated into another apparatus, or sonic features may be ignored or not performed. In addition, the displayed or discussed mutual couplings or direct couplings or communication connections may be implemented through some interfaces. The indirect couplings or communication connections between the modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A neural network scheduling method, wherein the method comprises:

determining a first batch size corresponding to each layer of one or more layers in a neural network;

forming, through grouping based on the first batch size, the neural network into a neural network comprising at least one first layer group, wherein each first layer group comprises at least one layer in the neural network, first batch sizes corresponding to layers in each first layer group are the same, and a buffer requirement of each first layer group is less than or equal to a capacity of an on-chip memory;

forming, through grouping based on a grouping result of the first layer group, the neural network into a neural network comprising at least one second layer group that is determined based on operation overheads of the neural network, wherein each second layer group comprises at least one first layer group, a buffer requirement of each second layer group is less than or equal to the capacity of the on-chip memory, and at least one second layer group comprises at least two first layer groups with different first batch sizes, wherein the forming, through grouping based on a grouping result of the first layer group, the neural network into a neural network comprising at least one second layer group comprises:

when a buffer requirement existing when an $a^{th}$ first layer group to a $b^{th}$ first layer group in the neural network are scheduled is greater than the capacity of the on-chip memory, and a buffer requirement existing when the $a^{th}$ first layer group to a $(b-1)^{th}$ first layer group are scheduled is less than or equal to the capacity of the on-chip memory, determining the $a^{th}$ first layer group to the $b^{th}$ first layer group as a second layer group based on the operation overheads of the neural network, or determining the $a^{th}$ first layer group to the $(b-1)^{th}$ first layer group as a second layer group based on the operation overheads of the neural network, wherein at least two first layer groups corresponding to different first batch sizes exist in the $a^{th}$ first layer group to the $b^{th}$ first layer group in the neural network, and a and b are positive integers; and scheduling the neural network based on a grouping result of the second layer group.

2. The method according to claim 1, wherein the determining a first batch size corresponding to each layer of the one or more layers in a neural network comprises:

determining, for a buffer requirement of each layer of the one or more layers in the neural network and the capacity of the on-chip memory, the first batch size corresponding to each layer of the one or more layers in the neural network.

3. The method according to claim 2, wherein the determining, for a buffer requirement of each layer of the one or more layers in the neural network and the capacity of the on-chip memory, the first batch size corresponding to each layer of the one or more layers in the neural network comprises:

determining, for one or more pieces of input data and one or more pieces of output data of each layer of the one or more layers in the neural network and the capacity of the on-chip memory, the first batch size corresponding to each layer of the one or more layers in the neural network, wherein at least one piece of input data or at least one piece of output data of at least one layer in the neural network is stored in an off-chip memory.

4. The method according to claim 3, wherein the determining, for one or more pieces of input data and one or more pieces of output data of each layer of the one or more layers in the neural network and the capacity of the on-chip memory, the first batch size corresponding to each layer of the one or more layers in the neural network comprises:

adjusting storage locations of one or more pieces of input data or one or more pieces of output data of at least one layer in the neural network based on operation overheads of the neural network, wherein the storage location comprises the on-chip memory or the off-chip memory;

in a process of adjusting the storage location, obtaining storage locations that are of one or more pieces of input data and one or more pieces of output data of each layer of the one or more layers in the neural network; and determining the first batch size corresponding to each layer of the one or more layers in the neural network based on the storage locations of the one or more pieces of input data and the one or more pieces of output data of each layer of the one or more layers in the neural network and the capacity of the on-chip memory.

5. The method according to claim 1, wherein the forming, through grouping based on the first batch size, the neural network into a neural network comprising at least one first layer group comprises:

when a buffer requirement existing when an $i^{th}$ layer to a $j^{th}$ layer in the neural network are scheduled is greater than the capacity of the on-chip memory, and a buffer requirement existing when the $i^{th}$ layer to a $(j-1)^{th}$ layer are scheduled is less than or equal to the capacity of the on-chip memory, determining the $i^{th}$ layer to an $(i+m)^{th}$ layer as a first layer group based on the operation overheads of the neural network, wherein first batch sizes of the $i^{th}$ layer to the $j^{th}$ layer in the neural network are the same, i, j, and m are positive integers, and $(i+m)\leq(j-1)$.

6. The method according to claim 5, wherein the determining the $i^{th}$ layer to an $(i+m)^{th}$ layer as a first layer group based on operation overheads of the neural network comprises:

obtaining a plurality of corresponding operation overheads existing when the $i^{th}$ layer to a $t^{th}$ layer are scheduled, wherein the $t^{th}$ layer is any one of an $(i+1)^{th}$ layer to the $(j-1)^{th}$ layer, t is a positive integer, and $(i+1)\leq t\leq(j-1)$; and when the $i^{th}$ layer to the $(i+m)^{th}$ layer are scheduled, reducing the operation overheads of the neural network.

7. The method according to claim 1, wherein the method further comprises:

when the $a^{th}$ first layer group to the $b^{th}$ first layer group are determined as a second layer group, reducing a first batch size corresponding to the $b^{th}$ first layer group or the $(b-1)^{th}$ first layer group.

8. The method according to claim 1, wherein the determining the $a^{th}$ first layer group to the $b^{th}$ first layer group as a second layer group based on the operation overheads of the neural network, or determining the $a^{th}$ first layer group to the $(b-1)^{th}$ first layer group as a second layer group comprises:

when the $a^{th}$ first layer group to the $b^{th}$ first layer group are scheduled, enabling the operation overheads of the neural network to be first operation overheads, or when the $a^{th}$ first layer group to the $(b-1)^{th}$ first layer group are scheduled, enabling the operation overheads of the neural network to be second operation overheads; and when the first operation overheads are less than the second operation overheads, determining the $a^{th}$ first layer group to the $b^{th}$ first layer group as a second layer group, or when the second operation overheads are less than the first operation overheads, determining the $a^{th}$ first layer group to the $(b-1)^{th}$ first layer group as a second layer group.

9. A neural network scheduling apparatus, comprising at least one processor; and one or more non-transitory computer-readable storage medium coupled to the at least one processor and storing programming instructions for execution by the at least one processor, wherein the programming instructions, when executed, cause the apparatus to perform operations comprising:

determining a first batch size corresponding to each layer of one or more layers in a neural network;

forming, through grouping based on the first batch size, the neural network into a neural network comprising at least one first layer group, wherein each first layer group comprises at least one layer in the neural network, first batch sizes corresponding to layers in each first layer group are the same, and a buffer requirement of each first layer group is less than or equal to a capacity of an on-chip memory;

forming, through grouping based on a grouping result of the first layer group, the neural network into a neural network comprising at least one second layer group that is determined based on operation overheads of the neural network, wherein each second layer group comprises at least one first layer group, a buffer requirement of each second layer group is less than or equal to the capacity of the on-chip memory, and at least one second layer group comprises at least two first layer groups with different first batch sizes, wherein the forming, through grouping based on a grouping result of the first layer group, the neural network into a neural network comprising at least one second layer group comprises:

when a buffer requirement existing when an $a^{th}$ first layer group to a $b^{th}$ first layer group in the neural network are scheduled is greater than the capacity of the on-chip memory, and a buffer requirement existing when the $a^{th}$ first layer group to a $(b-1)^{th}$ first layer group are scheduled is less than or equal to the capacity of the on-chip memory, determining the $a^{th}$ first layer group to the $b^{th}$ first layer group as a second layer group based on the operation overheads of the neural network, or determining the $a^{th}$ first layer group to the $(b-1)^{th}$ first layer group as a second layer group based on the operation overheads of the neural network, wherein at least two first layer groups corresponding to different first batch sizes exist in the $a^{th}$ first layer group to the $b^{th}$ first layer group in the neural network, and a and b are positive integers; and scheduling the neural network based on a grouping result of the second layer group.

10. The apparatus according to claim 9, wherein the determining a first batch size corresponding to each layer of the one or more layers in a neural network comprises:

determining, for a buffer requirement of each layer of the one or more layers in the neural network and the capacity of the on-chip memory, the first batch size corresponding to each layer of the one or more layers in the neural network.

11. The apparatus according to claim 10, wherein the determining, for a buffer requirement of each layer of the one or more layers in the neural network and the capacity of the on-chip memory, the first batch size corresponding to each layer of the one or more layers in the neural network comprises:

determining, for one or more pieces of input data and one or more pieces of output data of each layer of the one or more layers in the neural network and the capacity of the on-chip memory, the first batch size corresponding to each layer of the one or more layers in the neural network, wherein at least one piece of input data or at least one piece of output data of at least one layer in the neural network is stored in an off-chip memory.

12. The apparatus according to claim 11, wherein the determining, for one or more pieces of input data and one or more pieces of output data of each layer of the one or more layers in the neural network and the capacity of the on-chip memory, the first batch size corresponding to each layer of the one or more layers in the neural network comprises:

adjusting storage locations of one or more pieces of input data or one or more pieces of output data of at least one layer in the neural network based on operation overheads of the neural network, wherein the storage location comprises the on-chip memory or the off-chip memory;

in a process of adjusting the storage location, obtaining storage locations that are of one or more pieces of input data and one or more pieces of output data of each layer of the one or more layers in the neural network; and determining the first batch size corresponding to each layer of the one or more layers in the neural network based on the storage locations of the one or more pieces of input data and the one or more pieces of output data of each layer of the one or more layers in the neural network and the capacity of the on-chip memory.

13. The apparatus according to claim 9, wherein the forming, through grouping based on the first batch size, the neural network into a neural network comprising at least one first layer group comprises:

when a buffer requirement existing when an $i^{th}$ layer to a $j^{th}$ layer in the neural network are scheduled is greater than the capacity of the on-chip memory, and a buffer requirement existing when the $i^{th}$ layer to a $(j-1)^{th}$ layer are scheduled is less than or equal to the capacity of the on-chip memory, determining the $i^{th}$ layer to an $(i+m)^{th}$ layer as a first layer group based on the operation overheads of the neural network, wherein first batch sizes of the $i^{th}$ layer to the $j^{th}$ layer in the neural network are the same, i, j, and m are positive integers, and $(i+m)\leq(j-1)$.

14. The apparatus according to claim 13, wherein the determining the $i^{th}$ layer to an $(i+m)^{th}$ layer as a first layer group based on operation overheads of the neural network comprises:

obtaining a plurality of corresponding operation overheads existing when the $i^{th}$ layer to a $t^{th}$ layer are scheduled, wherein the $t^{th}$ layer is any one of an $(i+1)^{th}$ layer to the $(j-1)^{th}$ layer, t is a positive integer, and $(i+1)\leq t\leq(j-1)$; and when the $i^{th}$ layer to the $(i+m)^{th}$ layer are scheduled, reducing the operation overheads of the neural network.

15. The apparatus according to claim 9, wherein the operations further comprise:

when the $a^{th}$ first layer group to the $b^{th}$ first layer group are determined as a second layer group, reducing a first batch size corresponding to the $b^{th}$ first layer group or the $(b-1)^{th}$ first layer group.

16. The apparatus according to claim 9, wherein the determining the $a^{th}$ first layer group to the $b^{th}$ first layer group as a second layer group based on the operation overheads of the neural network, or determining the $a^{th}$ first layer group to the $(b-1)^{th}$ first layer group as a second layer group comprises:

when the $a^{th}$ first layer group to the $b^{th}$ first layer group are scheduled, enabling the operation overheads of the neural network to be first operation overheads, or when the $a^{th}$ first layer group to the $(b-1)^{th}$ first layer group are scheduled, enabling the operation overheads of the neural network to be second operation overheads; and when the first operation overheads are less than the second operation overheads, determining the $a^{th}$ first layer group to the $b^{th}$ first layer group as a second layer group, or when the second operation overheads are less than the first operation overheads, determining the $a^{th}$ first layer group to the $(b-1)^{th}$ first layer group as a second layer group.

17. A non-transitory computer-readable storage medium, comprising computer instructions, that when executed by one or more processors, cause a computing device to perform operations comprising:

determining a first batch size corresponding to each layer of one or more layers in a neural network;

forming, through grouping based on the first batch size, the neural network into a neural network comprising at least one first layer group, wherein each first layer group comprises at least one layer in the neural network, first batch sizes corresponding to layers in each first layer group are the same, and a buffer requirement of each first layer group is less than or equal to a capacity of an on-chip memory;

forming, through grouping based on a grouping result of the first layer group, the neural network into a neural network comprising at least one second layer group that is determined based on operation overheads of the neural network, wherein each second layer group comprises at least one first layer group, a buffer requirement of each second layer group is less than or equal to the capacity of the on-chip memory, and at least one second layer group comprises at least two first layer groups with different first batch sizes, wherein the forming, through grouping based on a grouping result of the first layer group, the neural network into a neural network comprising at least one second layer group comprises:

when a buffer requirement existing when an $a^{th}$ first layer group to a $b^{th}$ first layer group in the neural network are scheduled is greater than the capacity of the on-chip memory, and a buffer requirement existing when the $a^{th}$ first layer group to a $(b-1)^{th}$ first layer group are scheduled is less than or equal to the capacity of the on-chip memory, determining the $a^{th}$ first layer group to the $b^{th}$ first layer group as a second layer group based on the operation overheads of the neural network, or determining the $a^{th}$ first layer group to the $(b-1)^{th}$ first layer group as a second layer group based on the operation overheads of the neural network, wherein at least two first layer groups corresponding to different first batch sizes exist in the $a^{th}$ first layer group to the $b^{th}$ first layer group in the neural network, and a and b are positive integers; and scheduling the neural network based on a grouping result of the second layer group.

18. The non-transitory computer-readable storage medium according to claim 17, wherein the determining a first batch size corresponding to each layer of the one or more layers in a neural network comprises:

determining, for a buffer requirement of each layer of the one or more layers in the neural network and the capacity of the on-chip memory, the first batch size corresponding to each layer of the one or more layers in the neural network.

19. The non-transitory computer-readable storage medium according to claim 17, wherein the operations further comprise:

when the $a^{th}$ first layer group to the $b^{th}$ first layer group are determined as a second layer group, reducing a first batch size corresponding to the $b^{th}$ first layer group or the $(b-1)^{th}$ first layer group.

20. The non-transitory computer-readable storage medium according to claim 17, wherein the determining the $a^{th}$ first layer group to the $b^{th}$ first layer group as a second layer group based on the operation overheads of the neural network, or determining the $a^{th}$ first layer group to the $(b-1)^{th}$ first layer group as a second layer group comprises:

when the $a^{th}$ first layer group to the $b^{th}$ first layer group are scheduled, enabling the operation overheads of the neural network to be first operation overheads, or when the $a^{th}$ first layer group to the $(b-1)^{th}$ first layer group are scheduled, enabling the operation overheads of the neural network to be second operation overheads; and when the first operation overheads are less than the second operation overheads, determining the $a^{th}$ first layer group to the $b^{th}$ first layer group as a second layer group, or when the second operation overheads are less than the first operation overheads, determining the $a^{th}$ first layer group to the $(b-1)^{th}$ first layer group as a second layer group.

* * * * *